US009161016B2

(12) United States Patent
Sawachi

(10) Patent No.: US 9,161,016 B2
(45) Date of Patent: Oct. 13, 2015

(54) IMAGE PROCESSING APPARATUS, IMAGING APPARATUS, REPRODUCTION APPARATUS, AND IMAGE PROCESSING METHOD FOR PROCESSING ZOOM IN 3D IMAGING

(71) Applicant: FUJIFILM Corporation, Tokyo (JP)

(72) Inventor: Youichi Sawachi, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 15 days.

(21) Appl. No.: 13/711,426

(22) Filed: Dec. 11, 2012

(65) Prior Publication Data

US 2013/0100257 A1   Apr. 25, 2013

Related U.S. Application Data

(63) Continuation of application No. PCT/JP2011/078648, filed on Dec. 12, 2011.

(30) Foreign Application Priority Data

Jan. 26, 2011   (JP) .................................. 2011-014464

(51) Int. Cl.
*H04N 13/02* (2006.01)
*H04N 13/00* (2006.01)

(52) U.S. Cl.
CPC ....... *H04N 13/0246* (2013.01); *H04N 13/0022* (2013.01); *H04N 13/0029* (2013.01); *H04N 13/0239* (2013.01); *H04N 2013/0081* (2013.01)

(58) Field of Classification Search
None
See application file for complete search history.

(56) References Cited

U.S. PATENT DOCUMENTS

| 6,384,859 B1 * | 5/2002 | Matsumoto et al. ............ 348/43 |
| 6,414,709 B1 * | 7/2002 | Palm et al. ...................... 348/47 |
| 2006/0012596 A1 * | 1/2006 | Fukuya .......................... 345/419 |
| 2008/0029714 A1 * | 2/2008 | Olsen et al. ................. 250/475.2 |
| 2008/0129844 A1 * | 6/2008 | Cusack et al. ................ 348/241 |

(Continued)

FOREIGN PATENT DOCUMENTS

| EP | 1 489 857 A1 | 12/2004 |
| EP | 2 410 753 A2 | 1/2012 |
| JP | 08-009421 A | 1/1996 |

(Continued)

OTHER PUBLICATIONS

European Search Report dated Nov. 21, 2013.

(Continued)

*Primary Examiner* — Joseph Ustaris
*Assistant Examiner* — Mikhail Itskovich
(74) *Attorney, Agent, or Firm* — McGinn IP Law Group, PLLC

(57) ABSTRACT

A image processing method according to an aspect of the present invention includes a parallax amount calculating step of calculating a parallax amount of each pixel of a plurality of viewpoint images constituting a multi-viewpoint image; and a parallax amount correcting step of correcting the parallax amount of each pixel, based on a zoom value of the multi-viewpoint image and the calculated parallax amount of each pixel, in such a manner that a different in parallax amount corresponding to an object distance is kept unchanged even if the zoom value is changed, when a parallax amount of each pixel of at least a portion of the multi-viewpoint image is corrected by image processing.

28 Claims, 19 Drawing Sheets

(56) References Cited

U.S. PATENT DOCUMENTS

2010/0201789 A1     8/2010    Yahagi
2010/0247088 A1*   9/2010    Campbell et al. ............. 396/325

FOREIGN PATENT DOCUMENTS

| | | |
|---|---|---|
| JP | 08-317429 A | 11/1996 |
| JP | 2003-052058 A | 2/2003 |
| JP | 2005-130310 A | 5/2005 |
| JP | 2010-068182 A | 3/2010 |
| WO | WO 2010/104089 A1 | 9/2010 |
| WO | WO 2010/151044 A2 | 12/2010 |

OTHER PUBLICATIONS

International Search Report in PCT/JP2011/078648 dated Mar. 13, 2012(English Translation Thereof).
European Official Communication dated Jul. 29, 2014.
European Office Action dated Mar. 20, 2015.

* cited by examiner

T-END STEREOSCOPIC IMAGE
BEFORE PARALLAX
AMOUNT CORRECTION

T-END STEREOSCOPIC IMAGE
AFTER PARALLAX
AMOUNT CORRECTION

FIG.12

UNCORRECTED PARALLAX AMOUNT

| ZOOM VALUE | Pmin | | | −2 | −1 | 0 | 1 | 2 | 3 | | | | Pmax |
|---|---|---|---|---|---|---|---|---|---|---|---|---|---|
| 0 | Ptf | • | • | • | • | • | • | • | • | • | • | • | • Ptn |
| 1 | • | • | • | • | • | • | • | • | • | • | • | • | • |
| 2 | • | • | • | • | • | • | • | • | • | • | • | • | • |
| 3 | • | • | • | • | • | • | • | • | • | • | • | • | • |
| • | • | • | • | • | • | • | • | • | • | • | • | • | • |
| • | • | • | • | • | • | • | • | • | • | • | • | • | • |
| 10 | • | • | • | Pwf | • | • | • | • | • | • | • | Pwn | • • |

FIG.13

CASE OF MONITOR HAVING A
RESOLUTION OF 1920 × 1080

| SIZE | PIXEL |
|---|---|
| 200 | 22 |
| 100 | 43 |
| 65 | 67 |
| 60 | 72 |
| 55 | 79 |
| 50 | 87 |
| 45 | 96 |
| 40 | 108 | ized

IMAGE PROCESSING APPARATUS, IMAGING APPARATUS, REPRODUCTION APPARATUS, AND IMAGE PROCESSING METHOD FOR PROCESSING ZOOM IN 3D IMAGING

CROSS-REFERENCE TO RELATED APPLICATIONS

This application is a PCT Bypass continuation application and claims the priority benefit under 35 U.S.C. §120 of PCT Application No. PCT/JP2011/078648 filed on Dec. 12, 2011 which application designates the U.S., and also claims the priority benefit under 35 U.S.C. §119 of Japanese Patent Application No. 2011-014464 filed on Jan. 26, 2011, which applications are all hereby incorporated in their entireties by reference.

BACKGROUND OF THE INVENTION

1. Field of the Invention

The present invention relates to an image processing apparatus, an imaging apparatus, a reproduction apparatus, and an image processing method that change a magnification of a multi-viewpoint image composed of a plurality of viewpoint images, and in particular to an image processing apparatus, an imaging apparatus, a reproduction apparatus, and an image processing method that facilitate stereopsis followability when zoom is changed, so that the viewer's feeling of fatigue can be reduced.

2. Description of the Related Art

Conventionally, changing a magnification of a multi-viewpoint image composed of a plurality of viewpoint images is performed.

Japanese Patent Application Laid-Open No. 2003-052058 describes matching the respective centers of a left eye image and a right eye image with each other according to a change in magnification, and controlling the respective horizontal shift amounts of the left eye image and the right eye image according to the change in magnification.

Japanese Patent Application Laid-Open No. 08-317429 describes cutting out a stereoscopic image in accordance with the respective cutout areas of right and left images so determined as to fall within a binocular fusional area of a viewer.

SUMMARY OF THE INVENTION

Conventionally, when stereoscopic imaging is performed, for example, photographing is performed with a focused main object set at the respective centers of viewpoint images (a left eye image and a right eye image), and with convergence so set as to minimize a parallax amount of the main object.

In this state, however, when zooming is performed from a wide-angle side toward a telephoto side, such an object displacement occurs that an object in front of the main object becomes nearer while a distant object becomes farther. This object displacement causes a viewer a strong feeling of visual strangeness, which results in an increase in viewer's fatigue.

Furthermore, an image cannot be fused stereoscopically due to parallax increase, parallax divergence, or the like, which results in a concern for safety.

Japanese Patent Application Laid-Open Nos. 2003-052058 and 08-317429 disclose controlling the cutout area or the horizontal shift amount of respective viewpoint images (a right eye image and a left eye image). However, since a multi-viewpoint image actually includes many object images different in distance, it is difficult to adjust the parallax amount of an object other than a main object suitably only by controlling the cutout area or the horizontal shift amount. That is, a conventional technique does not correct the parallax amount of each pixel, and therefore has the problem that an object which is not placed at the center of an image or an object other than a main object has an excessive parallax amount, or appears with unnatural depth.

The present invention has been made in view of these circumstances, and an object of the present invention is to provide an image processing apparatus, an imaging apparatus, a reproduction apparatus, and an image processing method that facilitate stereopsis followability when zoom is changed, thereby reducing viewer's feeling of fatigue.

In order to achieve the object, an image processing apparatus according to an aspect of the present invention includes: image acquiring means configured to acquire a multi-viewpoint image composed of a plurality of viewpoint images; zoom value acquiring means configured to acquire a zoom value of the multi-viewpoint image acquired by the image acquiring means; parallax amount calculating means configured to calculate a parallax amount of each pixel between the plurality of viewpoint images constituting the acquired multi-viewpoint image; parallax amount correcting means configured to correct the parallax amount of each pixel of at least one of the acquired multi-viewpoint image by image processing, based on the zoom value acquired by the zoom value acquiring means and the parallax amount of each pixel calculated by the parallax amount calculating means, the parallax amount correcting means configured to correct the parallax amount of the each pixel and configured to reconstruct the multi-viewpoint image in such a manner that a difference in parallax amount corresponding to an object distance is kept unchanged even if the acquired zoom value is changed.

According to the above aspect, the parallax amount of each pixel of the multi-viewpoint image is corrected based on the zoom value acquired by the zoom value acquiring means and the parallax amount of each pixel calculated by the parallax amount calculating means, and the multi-viewpoint image is reconstructed by image processing in such a manner that a difference in parallax amount corresponding to an object distance (a space between stereoscopic images) is kept unchanged even if the acquired zoom value is changed. Therefore, a feeling of distance given to a viewer during zooming (a space between stereoscopic images visible in a depthwise direction) is not changed. That is, not only is it possible to prevent parallax excess and parallax divergence, but it is also possible to facilitate stereopsis followability when zoom is changed, thereby reducing viewer's feeling of fatigue.

Here, the parallax amount represents a shifted amount of the same object of a plurality of viewpoint images constituting a multi-viewpoint image. The, parallax amount is represented, for example, by the number of pixels of a pickup image or a display image, the ratio of the shifted amount to the lateral size of an image, or the like.

In another aspect of the present invention, the parallax amount correcting means corrects the parallax amount of the each pixel in such a manner that a parallax amount of each object is kept unchanged even if the acquired zoom value is changed. According to this aspect, since the position of a stereoscopic image visible in a depthwise direction during zooming (depthwise position) is not displaced, a viewer can view only a change in the stereoscopic size of an object. That is, unnaturalness in zooming can be further reduced, and therefore viewer's feeling of fatigue can be further reduced.

In another aspect of the present invention, the parallax amount correcting means equalizes parallax amounts at a zoom start point and at a zoom termination point.

In another aspect of the present invention, the parallax amount correcting means corrects the parallax amount of the each pixel in such a manner that stereoscopic images of respective objects become nearer to a viewer as the acquired zoom value changes from a wide-angle side toward a telephoto side. That is, when the zoom value is changed from the wide-angle side toward the telephoto side, without changing a depthwise space of a plurality of stereoscopic images different in object distance, the parallax amount of each pixel is corrected in such a manner that the stereoscopic images of respective objects get nearer to the viewer. Therefore, zooming can be enhanced without making a viewer feel fatigued.

In another aspect of the present invention, the parallax amount correcting means performs correction in such a manner that the parallax amount changes nonlinearly from a wide-angle side toward a telephoto side. That is, by showing movement of stereoscopic images of respective objects at an accelerated rate, zooming can be enhanced.

In another aspect of the present invention, the parallax amount correcting means corrects the parallax amount of the each pixel in such a manner that the difference in parallax amount between objects different in object distance is kept constant between the nearest distance and the farthest distance with respect to the change in zoom value between a nearest distance and a farthest distance.

In another aspect of the present invention, the parallax amount correcting means corrects the parallax amount of the each pixel in such a manner that the difference in parallax amount corresponding to an object distance is kept unchanged, even if the acquired zoom value is changed, during a changing period of magnification for which the acquired zoom value is changing, and the parallax amount correcting means changes the difference in parallax amount corresponding to an object distance after a magnification change termination at which the acquired zoom value stops changing.

In another aspect of the present invention, the parallax amount correcting means corrects the parallax amount of the each pixel, after the magnification change termination, in such a manner that the difference in parallax amount corresponding to the object distance increases toward a telephoto side.

In another aspect of the present invention, the parallax amount correcting means changes the difference in parallax amount corresponding to the object distance in a stepwise fashion after the magnification change termination.

In another aspect of the present invention, the parallax amount correcting means changes the difference in parallax amount corresponding to the object distance, after the magnification change termination, over substantially the same length of time as a magnification change.

In another aspect of the present invention, the image processing apparatus further includes storing means configured to store a correction table indicating a correspondence relationship between an uncorrected parallax amount, a zoom value, and a corrected parallax amount, and the parallax amount correcting means reconstructs the multi-viewpoint image with use of the corrected parallax amount acquired from the correction table based on the acquired zoom value and the calculated parallax amount of each pixel.

In another aspect of the present invention, the storing means stores a plurality of correction tables having different correction amounts of the parallax amount corresponding to variations of the zoom value, and the parallax amount correcting means selects any one of the plurality of correction tables to reconstruct the multi-viewpoint image.

In another aspect of the present invention, the image processing apparatus further includes instruction inputting means configured to accept a selection instruction by which any one is selected from a plurality of modes corresponding to the plurality of correction tables, respectively, and, in the image processing apparatus, the parallax amount correcting means selects the correction table corresponding to the mode selected by the instruction inputting means.

In another aspect of the present invention, the image processing apparatus further includes storing means configured to store a correction table indicating a corresponding relationship between an uncorrected parallax amount, a zoom value, and a corrected parallax amount, the storing means configured to store a first correction table in which the difference in parallax amount corresponding to the object distance is kept unchanged even if the zoom value is changed, and a second correction table in which the difference in parallax amount corresponding to the object distance is changed corresponding to variations of then zoom value, and, in the image processing apparatus, the parallax amount correcting means selects the first correction table during the changing period of magnification and selects the second correction table after the magnification change termination, and reconstructs the multi-viewpoint image with use of the corrected parallax amount acquired from the selected correction table based on the acquired zoom value and the calculated parallax amount of each pixel.

In another aspect of the present invention, the image processing apparatus further includes calculating means configured to calculate a corrected parallax amount of each pixel based on the acquired zoom value and the calculated parallax amount of each pixel.

In another aspect of the present invention, the image processing apparatus further includes recording means configured to record a multi-viewpoint image whose parallax amount has not been corrected yet by the parallax amount correcting means or a multi-viewpoint image whose parallax amount has been corrected by the parallax amount correcting means.

In another aspect of the present invention, the image acquiring means acquires the multi-viewpoint image whose parallax amount has not been corrected yet from the recording means, and the parallax amount correcting means corrects a parallax amount of each pixel of the multi-viewpoint image acquired from the recording means.

In another aspect of the present invention, the image processing apparatus further includes setting information inputting means configured to accept an input of setting information for determining a value used in the parallax amount correction; and parallax amount correction value calculating means configured to calculate a correction value of the parallax amount of the each pixel based on the setting information inputted by the setting information inputting means.

The setting information includes a display size of the multi-viewpoint image. In addition, the setting information includes distance information on at least either one of a nearest object and a farthest object.

In another aspect of the present invention, the image processing apparatus further includes parallax amount correction value calculating means configured to calculate a correction value of the parallax amount of each pixel, with the zoom value set at least one of a telephoto end and a wide-angle end, based on a parallax amount of a focused pixel.

In another aspect of the present invention, the image processing apparatus includes: electronic zoom means configured to change the magnification of the acquired multi-viewpoint image by electronic zoom; outputting means capable of outputting the acquired multi-viewpoint image; and controlling means configured to change, when the zoom value is changed, the magnification of the multi-viewpoint image immediately before or immediately after the zoom value is changed, according to the zoom value, by the electronic zoom means, configured to perform parallax amount correction according to the zoom value by the parallax amount correcting means, and configured to output a stereoscopic still image to the outputting means, while the controlling means outputs a stereoscopic moving image of the multi-viewpoint image acquired by the image acquiring means to the outputting means when the zoom value is not changed.

In another aspect of the present invention, the controlling means makes the length of time of displaying the stereoscopic still image changed in magnification longer than the period of a change in zoom value.

In another aspect of the present invention, the controlling means causes the outputting means to output the stereoscopic still image which is changed in magnification in a stepwise fashion by changing the zoom value in a stepwise fashion.

In another aspect of the present invention, the controlling means switches the stereoscopic still images in a fade-in or fade-out manner.

In addition, an imaging apparatus according to an aspect of the present invention is an imaging apparatus including the image processing apparatus described above, where the image acquiring means includes an imaging lens, and an imaging device configured to image an object image formed by the imaging lens.

In the imaging apparatus according to an aspect of the present invention, the imaging lens includes a zoom lens, and the zoom value acquiring means acquires a zoom value of the zoom lens as a zoom value of the multi-viewpoint image.

In addition, a reproduction apparatus according to an aspect of the present invention includes the image processing apparatus described above; and reproducing means configured to reproduce the reconstructed multi-viewpoint image in a stereoscopically viewable fashion.

In addition, an image processing method according to an aspect of the present invention is an image processing method using image acquiring means configured to acquire a multi-viewpoint image composed of a plurality of viewpoint images, and zoom value acquiring means configured to acquire a zoom value of the multi-viewpoint image acquired by the image acquiring means, and the method includes: a parallax amount calculating step of calculating a parallax amount of each pixel between the plurality of viewpoint images constituting the acquired multi-viewpoint image; and a parallax amount correcting step of correcting a parallax amount of each pixel of at least one of the acquired multi-viewpoint image by image processing, based on the acquired zoom value and the calculated parallax amount of each pixel, and correcting the parallax amount of each pixel and reconstructing the multi-viewpoint image in such a manner that a difference in parallax amount corresponding to an object distance is kept unchanged even if the acquired zoom value is changed.

According to the present invention, stereopsis followability when zoom is changed is facilitated so that viewer's feeling of fatigue can be reduced.

BRIEF DESCRIPTION OF THE DRAWINGS

FIG. 12 is a diagram illustrating a correspondence relationship between a zoom value, an uncorrected parallax amount, and a corrected parallax amount;

FIG. 13 is a diagram illustrating a correspondence relationship between a display size and pixels of a monitor;

DETAILED DESCRIPTION OF THE EMBODIMENTS

Hereinafter, with reference to the accompanying drawings, embodiments of the present invention will be described in detail.

Figure 1:
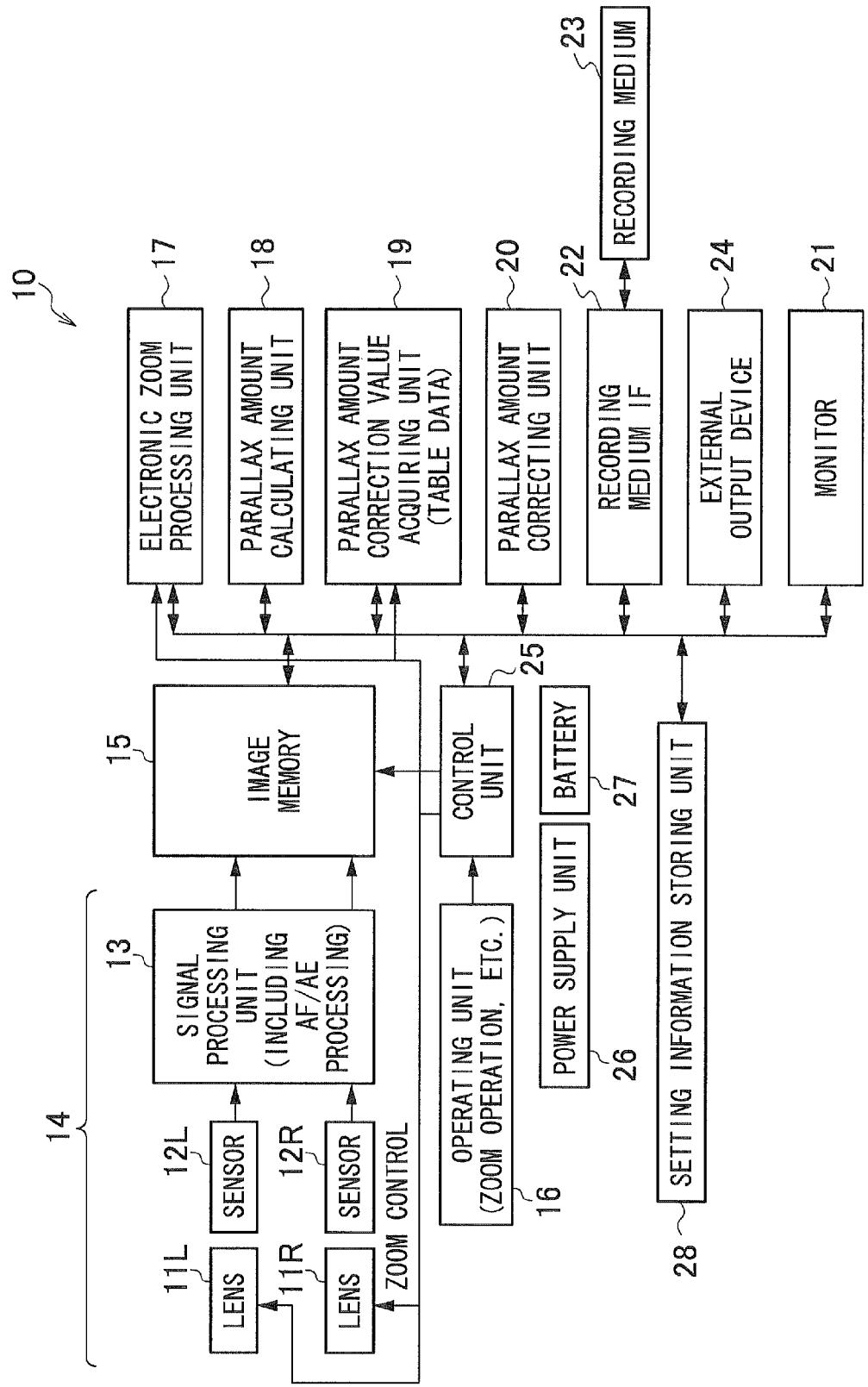
FIG. 1 is a block diagram illustrating an example of configuration of an imaging apparatus according to the present invention.

FIG. 1 is a block diagram illustrating a configuration example of an imaging apparatus according to the present invention.

An imaging apparatus 10 includes imaging lenses 11L, 11R, image sensors 12L, 12R, a signal processing unit 13, an image memory 15, an operating unit 16, an electronic zoom processing unit 17, a parallax amount calculating unit 18, a parallax amount correction value acquiring unit 19, a parallax amount correcting unit 20, a monitor 21, a recording medium interface 22, a recording medium 23, an external output device 24, a control unit 25, a power supply unit 26, a battery 27, and a setting information storage unit 28.

The imaging lenses 11L, 11R include optical systems forming images on acceptance surfaces of the image sensors 12L, 12R, respectively. The imaging lenses 11L, 11R of this example each include a focus lens, a zoom lens, and a diaphragm device.

The image sensors 12L, 12R pick up object images formed by the imaging lenses 11L, 11R, respectively. The image sensors 12L, 12R are each composed of an imaging device, such as a CCD (charge coupled device) image sensor, or a CMOS (complementary metal oxide semiconductor) image sensor.

The signal processing unit 13 performs various signal processing, such as AE (auto exposure) processing, or AF (auto focus adjustment) processing, on a multi-viewpoint image (a left eye image and a right eye image) outputted from the image sensors 12L, 12R.

In the imaging apparatus 10 of this example, the imaging lenses 11L, 11R, the image sensors 12L, 12R, and the signal processing unit 13 constitute an imaging unit 14 (image acquiring means) for acquiring a multi-viewpoint image composed of a plurality of viewpoint images.

The image memory 15 is a memory (for example, a RAM (random access memory)) for temporarily storing, frame by frame, a multi-viewpoint image outputted from the signal processing unit 13.

The operating unit 16 is an input device (for example, a key switch) for accepting user input operation.

In the imaging apparatus 10 of this example, the operating unit 16 constitutes zoom value acquiring means for acquiring a zoom value of the multi-viewpoint image acquired by the imaging unit 14.

The electronic zoom processing unit 17 uses electronic zoom (image processing), thereby changing the magnification of a multi-viewpoint image (a left eye image and a right eye image) acquired by the imaging unit 14, based on the zoom value acquired by the operating unit 16.

It should be noted that the imaging apparatus 10 of this example includes two variable magnification means: optical zoom based upon the imaging lenses 11L, 11R, and electronic zoom based upon an electronic zoom processing unit 17. Therefore, zoom values relating to the imaging lenses 11L, 11R are acquired in the case of optical zoom, while a zoom value relating to the electronically zooming is acquired in the case of electronic zoom. Both of the zooms may be used in combination. In addition, any zoom value acquiring method may be used.

The parallax amount calculating unit 18 calculates a parallax amount of each pixel between the plurality of viewpoint images (a left eye image and a right eye image) constituting the acquired multi-viewpoint image.

Here, the parallax amount represents a shifted amount of the same object between the plurality of viewpoint images constituting the multi-viewpoint image. The parallax amount is represented as, for example, the number of pixels of a pickup image or a display image, the ratio of the shift amount to the lateral size of an image, or the like.

The parallax amount correction value acquiring unit 19 acquires a value (parallax amount correction value) used to correct the parallax amount of each pixel in the plurality of viewpoint images.

The parallax amount correction value may be data of a table (correction table) indicating correspondence relationship between an uncorrected parallax amount, a zoom value, and a corrected parallax amount. In this case, the parallax amount correction value acquiring unit 19 is composed of, for example, a non-volatile storage device that stores the correction table.

The parallax amount correcting unit 20 reconstructs the multi-viewpoint image by using image processing to correct the parallax amount of each pixel acquired by the imaging unit 14, based on the zoom value acquired by the operating unit 16 and the parallax amount of each pixel calculated by the parallax amount calculating unit 18. The parallax amount correcting unit 20, specifically, corrects the parallax amount of each pixel of the multi-viewpoint image such that a difference in parallax amount corresponding to an object distance is not changed even if the acquired zoom value of the multi-viewpoint image changes. Here, the difference in parallax amount corresponding to an object distance is a difference in parallax amount with respect to a plurality of object stereoscopic images different in object distance, and corresponds to a depthwise space between the plurality of stereoscopic images different in object distance (a space between stereoscopic images).

It should be noted that the present invention is not limited to a case where all pixels of a multi-viewpoint image are corrected, and may be applied to a case where each pixel of a portion of a multi-viewpoint image is corrected.

In a case where the parallax amount correction value acquiring unit 19 is composed of table data (correction table), the parallax amount correcting unit 20 acquires a corrected parallax amount from the correction table, based on the zoom value acquired by the operating unit 16 and the parallax amount of each pixel calculated by the parallax amount calculating unit 18, and reconstructs the multi-viewpoint image using the acquired corrected parallax amount. The corrected parallax amount of each pixel may be acquired by calculation, and in this case the parallax amount correction value acquiring unit 19 calculates the corrected parallax amount of each pixel, based on the zoom value acquired by the operating unit 16 and the parallax amount of each pixel calculated by the parallax amount calculating unit 18.

The monitor (displaying means) 21, the recording medium interface 22, and the external output device 24 output a multi-viewpoint image.

The monitor 21 is a display device that reproduces and displays a multi-viewpoint image in a stereoscopically viewable fashion.

The recording medium interface 22 is an example of the external output device 24, and records a multi-viewpoint image on the recording medium 23, such as a memory card. Recording a multi-viewpoint image includes recording the multi-viewpoint image before the parallax amount is corrected by the parallax amount correcting unit 20 and recording the multi-viewpoint image after the parallax amount is corrected by the parallax amount correcting unit 20.

The external output device 24 is composed of, for example, a communication device that outputs (transmits) a multi-viewpoint image through communication.

The control unit 25 controls each part of the imaging apparatus 10. While the zoom value acquired by the operating unit 16 continues to change (during a changing period of magnification), the control unit 25 of this example causes the electronic zoom processing unit 17 to change the magnification of one frame of the multi-viewpoint image immediately before (or immediately after) the zoom value changes, causes the parallax amount correcting unit 20 to correct the parallax amount according to the zoom value, and causes the monitor 21 (or the external output device 24) to output the multi-viewpoint image with the changed magnification and the corrected parallax amount as a still image (stereoscopic still image). In addition, while the zoom value acquired by the operating unit 16 is not being changed (during an unchanging period of magnification), the control unit 25 of this example causes the monitor 21 (or the external output device 24) to output the multi-viewpoint image as a moving image (stereoscopic moving image).

In addition, the control unit 25 of this example performs control so as to make the length of time of displaying the stereoscopic still image whose magnification has been changed longer than the changing period of the zoom value.

In addition, the control unit 25 causes outputting means, such as the monitor 21, to output a stereoscopic still image whose magnification has been changed in a stepwise fashion by changing the zoom value in a stepwise fashion. In addition, the control unit 25 performs switching of a plurality of still images with changed magnifications in a fade-in and fade-out manner.

The power supply unit 26 supplies power from the battery 27 to each part of the imaging apparatus 10.

The setting information storage unit 28 stores various pieces of setting information.

Figure 2:
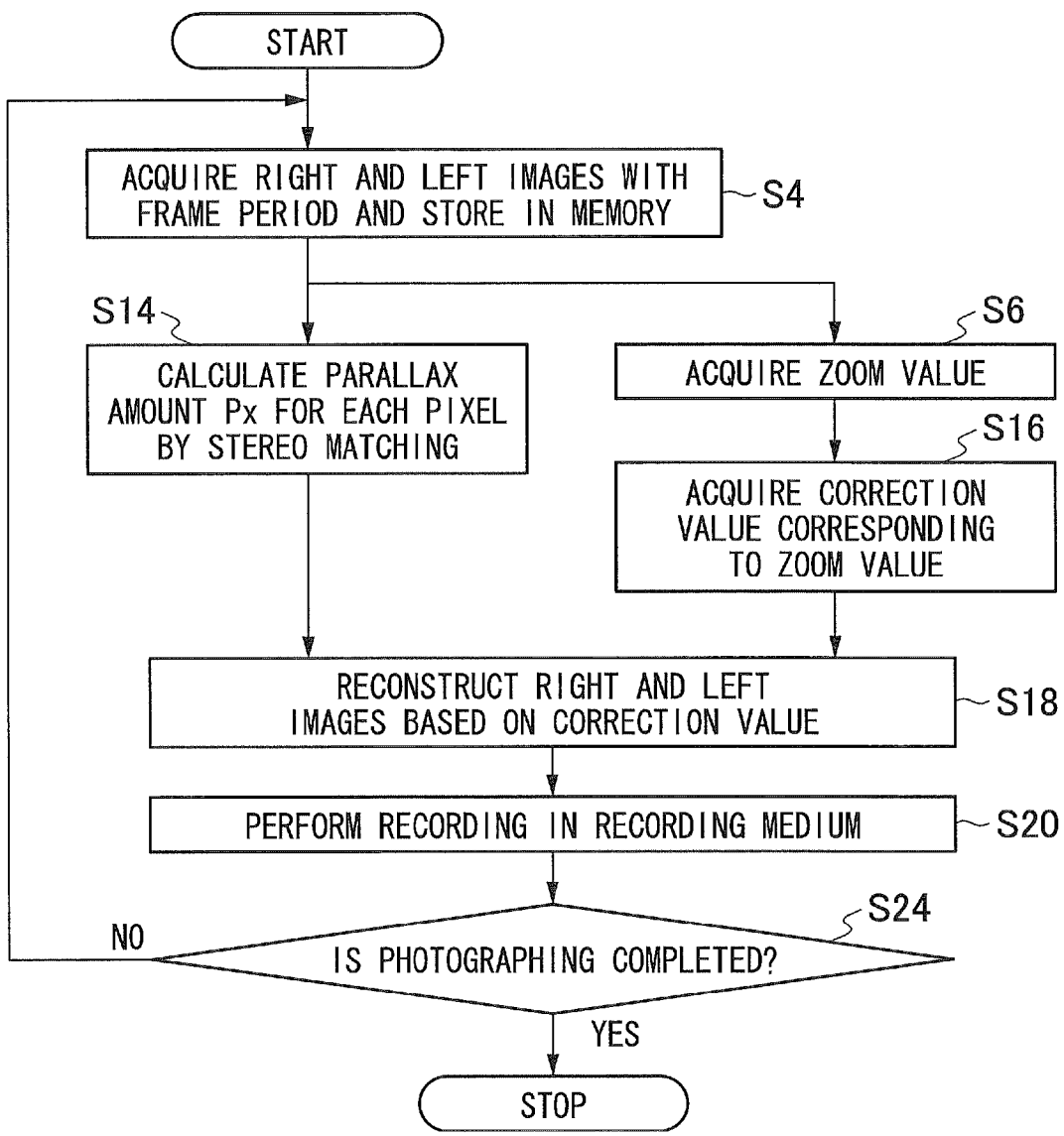
FIG. 2 is a flowchart illustrating a flow of an example of image processing performed in real time when a moving image is photographed.

FIG. 2 is a flowchart illustrating an example of a flow of image processing performed in real time when a moving image is photographed. This processing is executed according to a program by the control unit 25.

First, a multi-viewpoint images (a left eye image and a right eye image) is acquired by the imaging unit 14 with a period of one frame and stored in the image memory 15 (step S4), and a zoom value corresponding to the multi-viewpoint image is acquired by the operating unit 16 (step S6). The zoom value arbitrarily changes between a wide-angle end (nearest object distance) and a telephoto end (farthest object distance). Thereafter, the processing is performed frame by frame.

In addition, the parallax amount calculating unit 18 detects a corresponding point between the left eye image and the right eye image by stereo matching, thereby calculating a parallax amount Px for each pixel (step S14).

In addition, the parallax amount correction value acquiring unit 19 acquires a parallax amount correction value (for example, a corrected parallax amount) of each pixel from table data (a correction table) stored in a storage device in the parallax amount correction value acquiring unit 19, based on the zoom value acquired by the operating unit 16 and the parallax amount of each pixel calculated by the parallax amount calculating unit 18 (step S16).

Next, the parallax amount correcting unit 20 performs image processing to reconstruct the multi-viewpoint image (a left eye image and a right eye image) based on the parallax amount correction value (step S18). That is, the parallax amount of each pixel of the multi-viewpoint image is corrected based on the acquired zoom value and the calculated parallax amount of each pixel. In such a manner that this correction of the parallax amount does not cause a difference in parallax amount corresponding to an object distance (a space between stereoscopic images visible in a depthwise direction) to change even if the zoom value changes, the multi-viewpoint image is reconstructed by correcting the parallax amount of each pixel of the multi-viewpoint by image processing. In this example, the parallax amount of each pixel is corrected by the parallax amount correcting unit 20 such that the difference in parallax amount between the nearest object distance and the farthest object distance (for example, an infinite distance) is kept constant for a change in zoom value.

Next, the recording medium interface 22 records the reconstructed multi-viewpoint image on the recording medium 23 (step S20). The multi-viewpoint image may be outputted by the monitor 21 and the external output device 24.

Next, it is determined whether imaging is completed or continued (step S24), and if imaging is continued, the processing returns to step S4.

Figure 3:
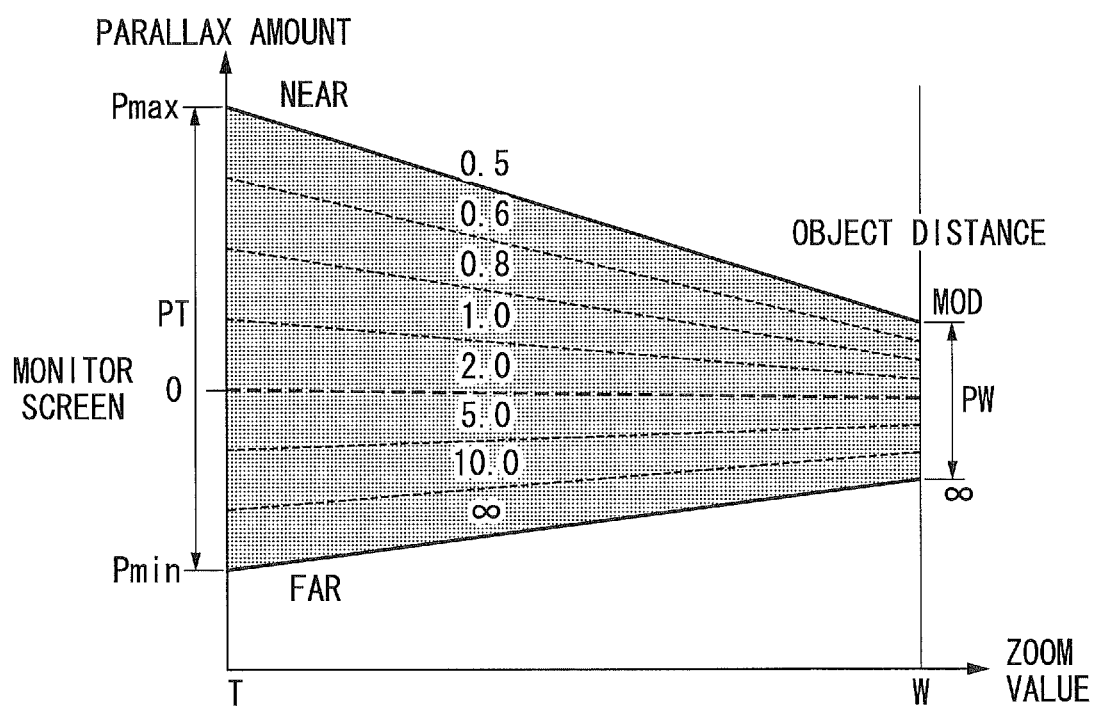
FIG. 3 is a diagram illustrating a correspondence relationship between a zoom value and an uncorrected parallax amount.

FIG. 3 illustrates a correspondence relationship between the zoom value and the parallax amount in the multi-viewpoint image (a left eye image and a right eye image) before the parallax amount is corrected. The horizontal axis indicates the zoom value, and the vertical axis indicates the uncorrected parallax amount. That is, a change in uncorrected parallax amount with respect to a change in zoom value (parallax amount distribution) is represented.

In FIG. 3, a plus or minus sign is attached to the parallax amount. When the sign is plus, a larger absolute value illustrates a nearer position of a stereoscopic image (visual image) of an object visible in the depthwise direction. When the sign is minus, a larger absolute value illustrates a farther position of a stereoscopic image (visual image) of an object visible in the depthwise direction. That is, a signed parallax amount illustrates a position of a stereoscopic image of an object in a depthwise direction (depthwise position). In this text, a stereoscopic image of an object becomes nearer to a viewer as a signed parallax amount increases, while a stereoscopic image of an object becomes farther away from a viewer as a signed parallax amount decreases.

In FIG. 3, the center of the vertical axis is the parallax of a convergence point (=0), and, in this imaging apparatus, the distance of the convergence point is set at 2.0 m. In this parallax distribution, a parallax above the center of the vertical axis indicates that an object is in nearer distance than the convergence point, while a parallax below the center of the vertical axis indicates that an object is in a farther distance than the convergence point. The upper side of the parallax distribution indicates a change in parallax amount with respect to a zoom change when the object distance is in the nearest object distance (MOD)=0.5 m, while the lower side thereof indicates a change in parallax amount with respect to a zoom change when the object distance is in the farthest object distance (in this example, an infinite distance).

In FIG. 3, the condition on which the parallax becomes largest is a zoom T end at an object distance of 0.5 m, and the parallax amount on that condition is represented as Pmax. Under this condition, a stereoscopic image is burst maximally from a screen of a monitor, and it is highly possible that the parallax becomes so excessively large that binocular fusion is difficult. On the other hand, the condition on which the parallax becomes smallest is a zoom W end at an infinite distance, and the parallax amount on that condition is represented as Pmin. Under this condition, a stereoscopic image is set back maximally from a screen of a monitor, and it is highly possible that a shifted amount of a stereoscopic image on the screen of a monitor exceeds a human interpupillary distance (divergence). Therefore, it is necessary to set an upper limit and a lower limit to the parallax amount by parallax amount correction.

In FIG. 3, an object located at an object distance of 2 m has a zero parallax irrespective of a change in zoom value, and therefore the parallax amount does not change. An object located at an object distance of more (father) than 2 m has a smaller signed parallax amount (has a larger absolute value) as the zoom value is changed from the W side to the T side. That is, when zooming is performed, such stereoscopic image displacement occurs that the stereoscopic image of the object becomes farther away while increasing in size, which causes a feeling of visual strangeness, and increases eye fatigue of a viewer viewing the stereoscopic image. An object located at an object distance of less (nearer) than 2 m has a larger signed parallax amount (also has a larger absolute value) as the zoom value is changed from the W side to the T side. That is, when zooming is performed, such stereoscopic image displacement occurs that the stereoscopic image of the object becomes nearer.

Hereinafter, various embodiments of parallax amount correction with respect to a zoom value change will be introduced.

Figure 4:
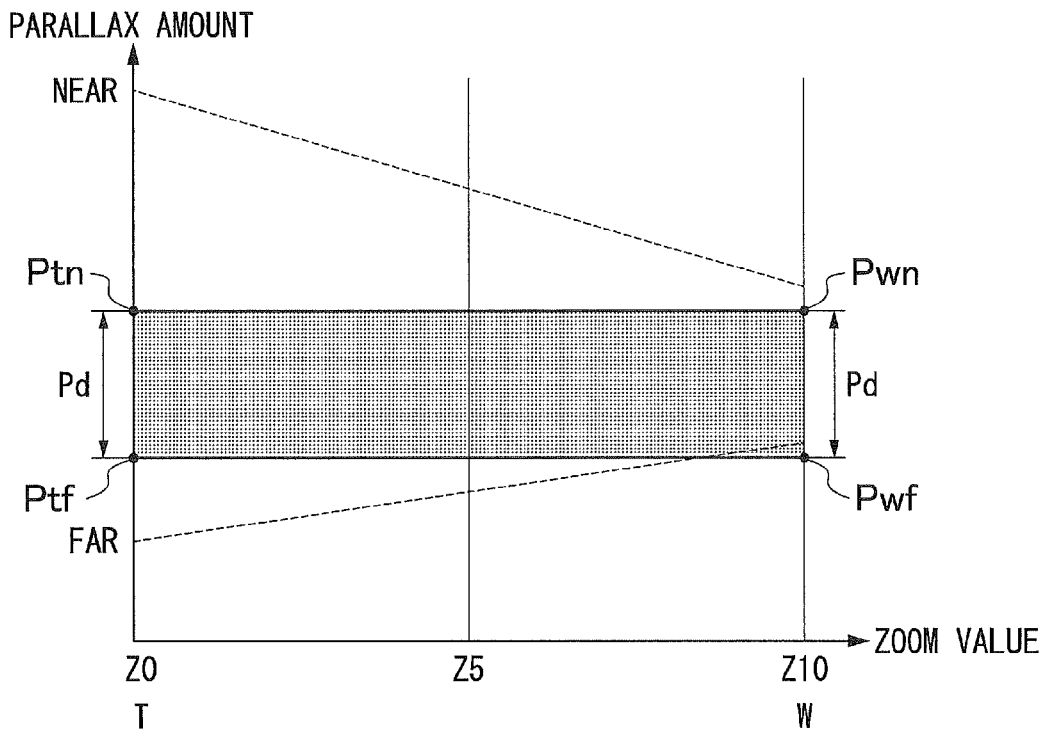
FIG. 4 is a diagram illustrating a correspondence relationship between a zoom value and a corrected parallax amount in a first embodiment.

FIG. 4 is an explanatory diagram for explaining parallax amount correction of a first embodiment, indicating a correspondence relationship between the zoom value and the corrected parallax amount. The maximum parallax amount is corrected from Pmax before correction to Ptn, the minimum parallax amount is corrected from Pmin to Pwf, and the parallax amount of each pixel with respect to each zoom value is so corrected as to be between Ptn and Pwf. The upper and lower lines (Ptn–Pwn, Ptf–Pwf) is set within a maximum width that is a difference between a limit excess parallax and a limit divergent parallax.

In this example, a difference Pd between the parallax amount of the nearest object distance and the parallax amount of the farthest object distance (maximum relative parallax amount) is set to be the same at the W end and the T end. In this example, Ptn=Pwn, and Ptf=Pwf.

In the first embodiment, the parallax amount correcting unit 20 corrects the parallax amount of each pixel to reconstruct a multi-viewpoint image such that the parallax amount in each object is not changed (that is, the position of a stereoscopic image visible in the depthwise direction is constant) even if the acquired zoom value changes. In this example, the parallax amount correcting unit 20 makes the parallax amounts at the zoom starting point and the zoom end point equal.

Figure 5A:
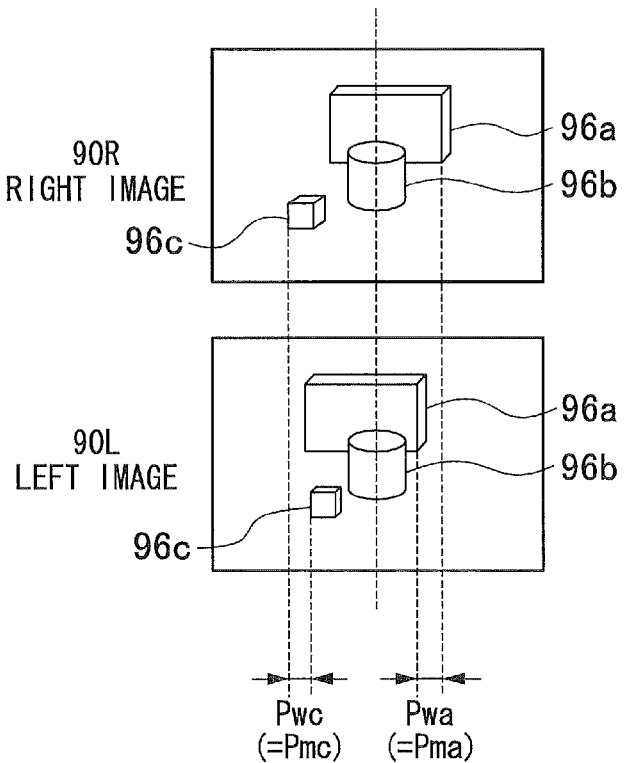
FIG. 5A is a diagram (wide-angle side) illustrating an example of a change in parallax amount when zooming is performed from a wide-angle side toward a telephoto side in the first embodiment.
Figure 5B:
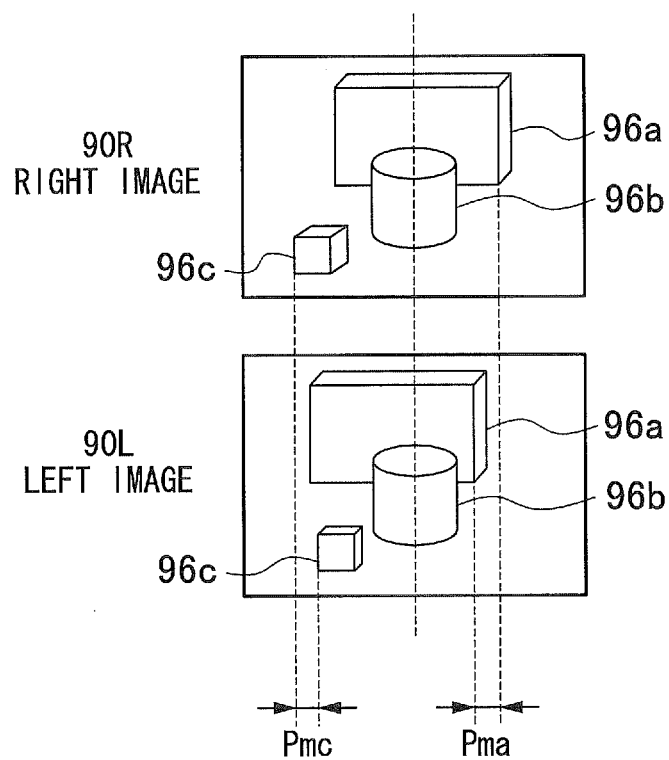
FIG. 5B is a diagram (middle zoom position) illustrating an example of a change in parallax amount when zooming is performed from a wide-angle side toward a telephoto side in the first embodiment.
Figure 5C:
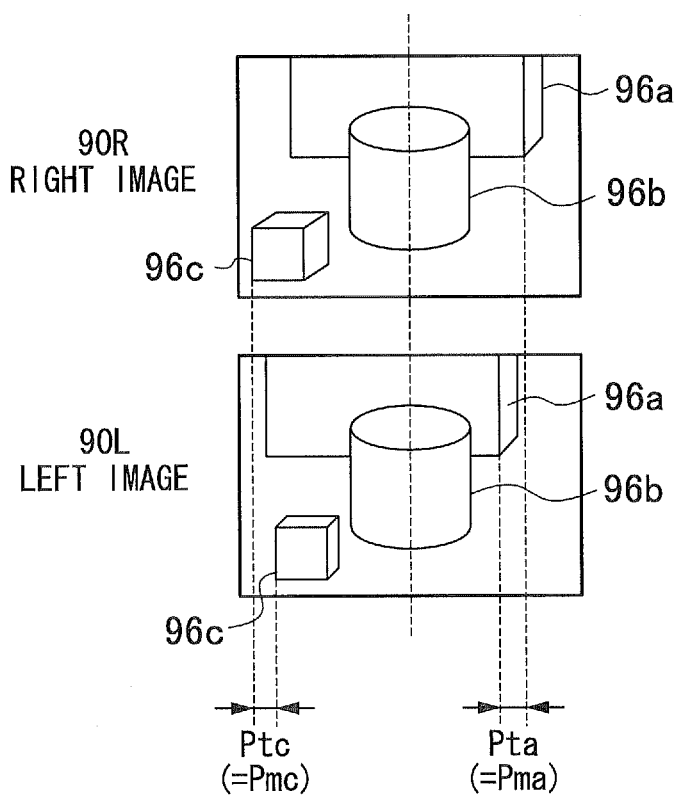
FIG. 5C is a diagram (telephoto side) illustrating an example of a change in parallax amount when zooming is performed from a wide-angle side toward a telephoto side in the first embodiment.

FIGS. 5A to 5C illustrate examples of multi-viewpoint images (left eye images 90L, right eye images 90R) at a W (wide-angle) end, a middle zoom position, and a T (telephoto) end, respectively, after the parallax amount correction of the first embodiment illustrated in FIG. 4 is performed. In FIGS. 5A to 5C, a reference sign 96a denotes a stereoscopic image of a distant object, a reference sign 96b denotes a stereoscopic image of a middle-distance object, and a reference sign 96c denotes a stereoscopic image of a near object. Reference signs Pwa, Pma, and Pta denote parallax amounts of the stereoscopic image of the distant object, reference signs Pwc, Pmc, and Ptc denote parallax amounts of the stereoscopic image of the near object. The stereoscopic image of the middle-distance object is a main object (for example, focused object), and the parallax amount thereof is set at zero irrespective of a change in zoom value.

In FIGS. 5A to 5C, Pwa=Pma=Pta, and Pwc=Pmc=Ptc. That is, the parallax amounts of respective objects (stereoscopic images) are so set as not to change even if the zoom value changes.

In fact, however, it is rare that an object is located at the farthest object distance or the nearest object distance when photographing is performed, and therefore the parallax amount correcting unit 20 can perform parallax amount correction such that where a position visible in a depthwise direction (a depthwise position) of the stereoscopic image of the object positioned between the farthest object distance and the nearest object distance at a photographing time is kept constant while the zoom value changes, as illustrated in FIGS. 5A to 5C.

Figure 6:
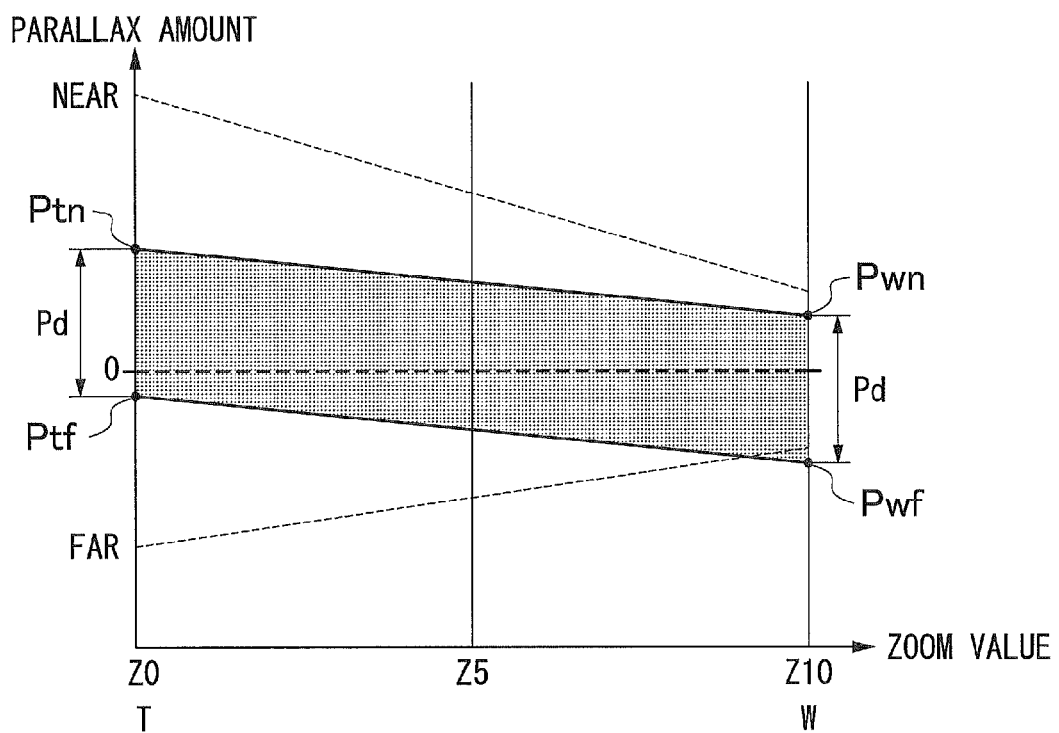
FIG. 6 is a diagram illustrating a correspondence relationship between a zoom value and a corrected parallax amount in a second embodiment.

FIG. 6 is an explanatory diagram for explaining parallax amount correction of a second embodiment, indicating a correspondence relationship between the zoom value and the corrected parallax amount. The second embodiment is the same as the first embodiment in that the maximum parallax amount is corrected from Pmax to Ptn, the minimum parallax amount is corrected from Pmin to Pwf, and the parallax amount of each pixel is so corrected as to be between Ptn and Pwf. In addition, a maximum relative parallax amount Pd is the same at the W end and the T end. In this example, Ptn>Pwn, and Ptf>Pwf.

In the second embodiment, the parallax amount correcting unit 20 corrects the parallax amount of each pixel such that stereoscopic images of respective objects become nearer to a viewer as the acquired zoom value changes from the wide-angle side toward the telephoto side (that is, the signed parallax amounts of stereoscopic images of respective objects increase).

By displacing the stereoscopic images of all objects in the depthwise direction by the same amount, a depthwise space between the plurality of stereoscopic images different in object distance can be maintained. This makes it possible to facilitate stereopsis followability while enhancing a feeling of zooming, and therefore a feeling of fatigue can be reduced.

Figure 7A:
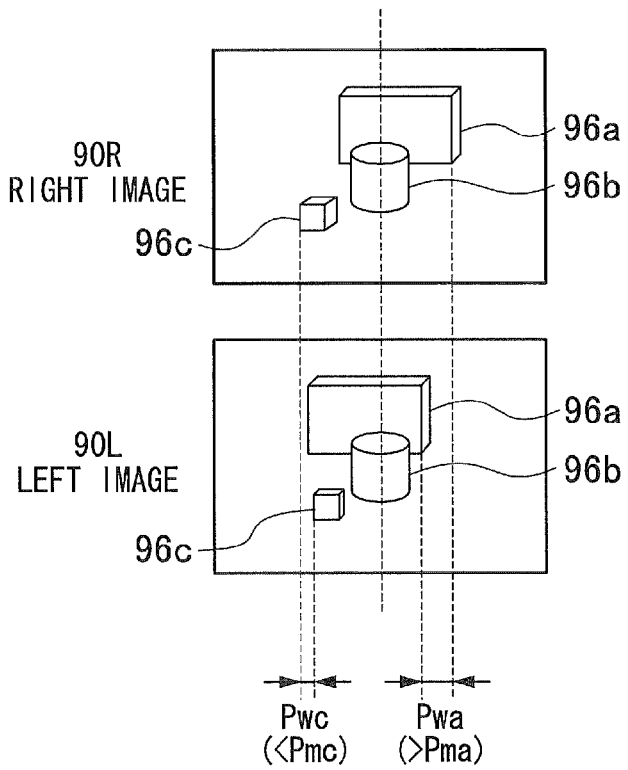
FIG. 7A is a diagram (wide-angle side) illustrating an example of a change in parallax amount when zooming is performed from a wide-angle side toward a telephoto side in the second embodiment.
Figure 7B:
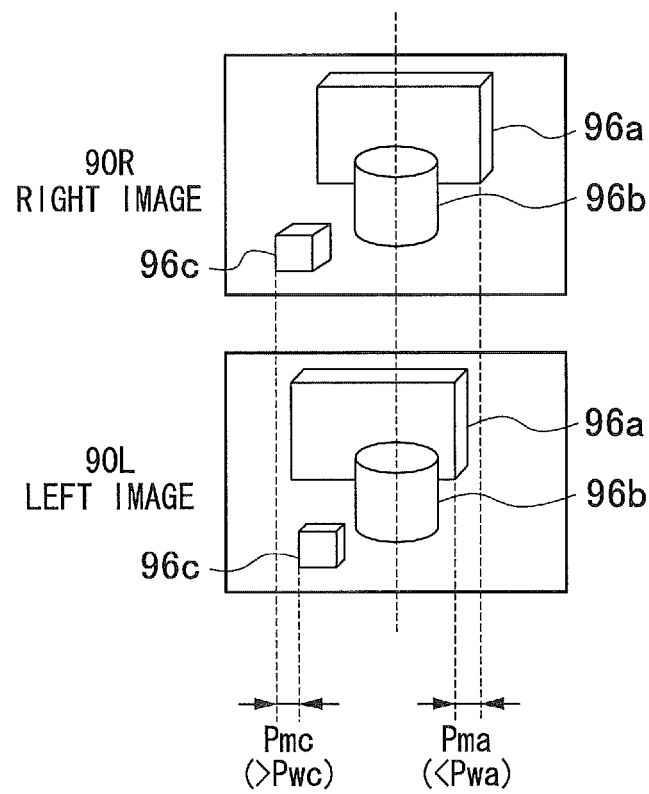
FIG. 7B is a diagram (middle zoom position) illustrating an example of a change in parallax amount when zooming is performed from a wide-angle side toward a telephoto side in the second embodiment.
Figure 7C:
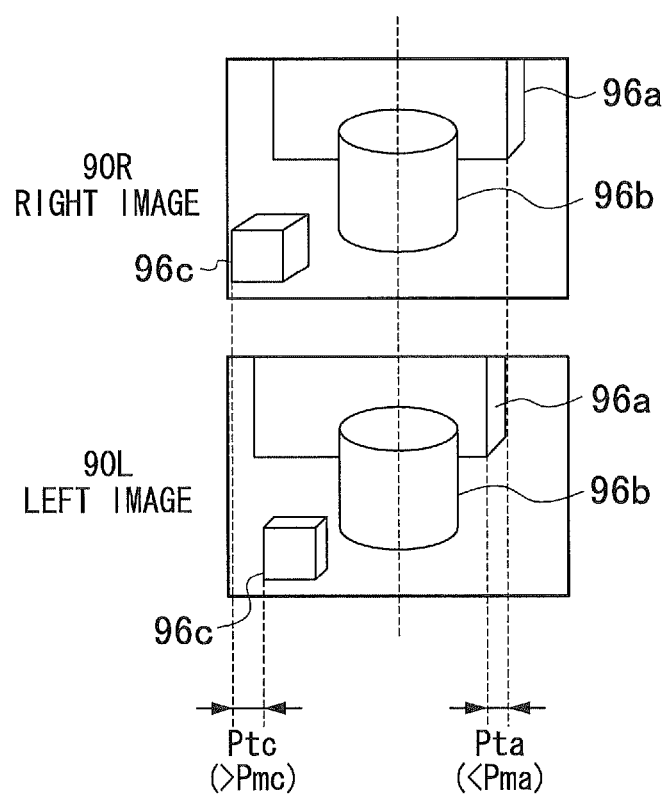
FIG. 7C is a diagram (telephoto side) illustrating an example of a change in parallax amount when zooming is performed from a wide-angle side toward a telephoto side in the second embodiment.

FIGS. 7A to 7C illustrate examples of multi-viewpoint images (left eye images 90L, right eye images 90R) at a W (wide-angle) end, a middle zoom position, and a T (telephoto) end, respectively, after the parallax amount correction of the second embodiment illustrated in FIG. 6 is performed. In FIGS. 7A to 7C, a reference sign 96a denotes a stereoscopic image of a distant object, a reference sign 96b denotes a stereoscopic image of a middle-distance object, and a reference sign 96c denotes a stereoscopic image of a near object. Reference signs Pwa, Pma, and Pta denote parallax amounts of the stereoscopic image of the distant object, reference signs Pwc, Pmc, and Ptc denote parallax amounts of the stereoscopic image of the near object. The stereoscopic image of the middle-distance object is a main object (for example, focused object), and the parallax amount thereof is set at zero irrespective of a change in zoom value.

A difference in parallax amount between the stereoscopic image 96a of the distant object and the stereoscopic image 96c of the near object in the multi-viewpoint image at the W end illustrated in FIG. 7A (Pwa−Pwc), a difference in parallax amount between the stereoscopic image 96a of the distant object and the stereoscopic image 96c of the near object in the multi-viewpoint image at the middle zoom position illustrated in FIG. 7B (Pma−Pmc), and a difference in parallax amount between the stereoscopic image 96a of the distant object and the stereoscopic image 96c of the near object in the multi-viewpoint image at the T end illustrated in FIG. 7C (Pta−Ptc) are identical with each other. That is, the multi-viewpoint image is reconstructed such that relative differences in parallax amount between objects different in object distance (96a and 96b, 96b and 96c, and 96a and 96c) are not changed even if the zoom value changes. Here, the parallax amount is a signed parallax amount, and corresponds to a position that is visible to a viewer in a depthwise direction of a stereoscopic image of an object (depthwise position). The difference in parallax amount corresponds to a depthwise space of a plurality of stereoscopic images visible to a viewer.

In fact, however, it is rare that an object is located at the farthest object distance or the nearest object distance when photographing is performed, and therefore the parallax amount correcting unit 20 can perform parallax amount correction such that a difference in parallax amount between the farthest object distance and the nearest object distance (a maximum value of the space between stereoscopic images) is kept constant at a photographing time while the zoom value changes, as illustrated in FIGS. 7A to 7C.

Figure 8:
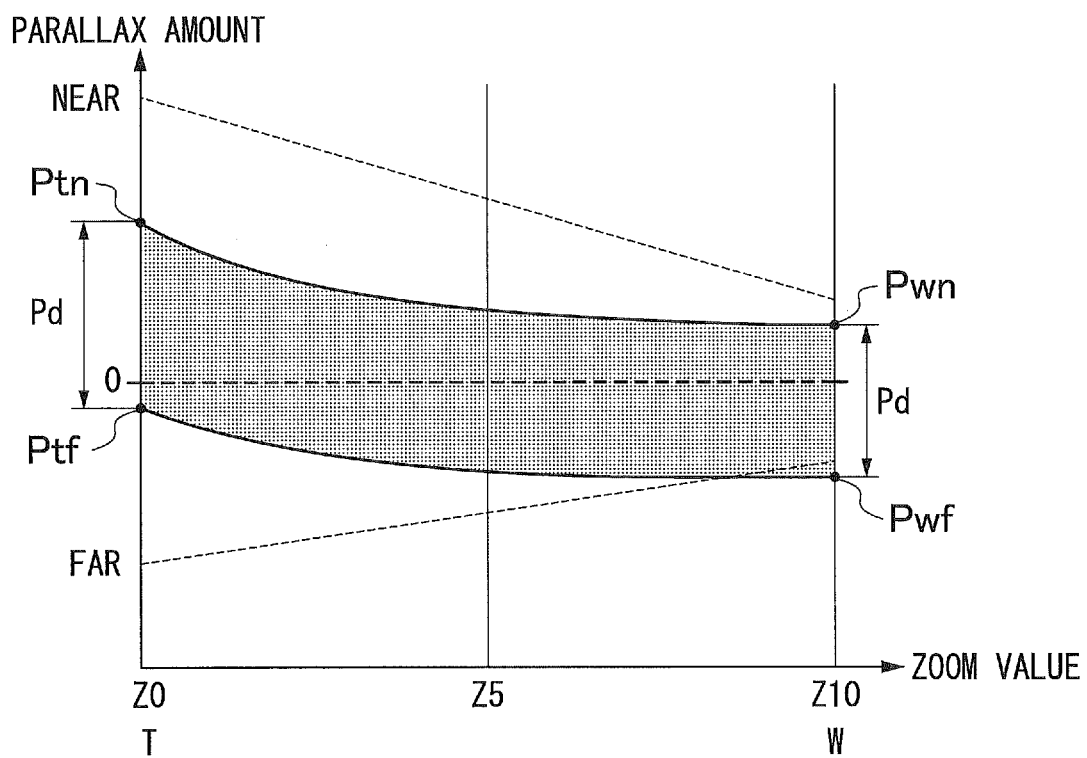
FIG. 8 is a diagram illustrating a correspondence relationship between a zoom value and a corrected parallax amount in a third embodiment.

FIG. 8 is an explanatory diagram for explaining parallax amount correction of a third embodiment, indicating a correspondence relationship between the zoom value and the corrected parallax amount. The third embodiment is the same as the first embodiment in that the maximum parallax amount is corrected from Pmax to Ptn, the minimum parallax amount is corrected from Pmin to Pwf, and the parallax amount of each pixel is so corrected as to be between Ptn and Pwf. In addition, a maximum relative parallax amount Pd is the same at the W end and the T end.

In the example illustrated in FIG. 8, the lines Ptf−Pwf, Ptn−Pwn are nonlinear, and the amount of change in parallax amount with respect to the amount of change in zoom value increases toward the T end. That is, a depthwise displacement of a stereoscopic image of an object increases toward the T end.

In the third embodiment, the parallax amount correcting unit 20 performs correction so as to change the parallax amount nonlinearly from the wide-angle end toward the telephoto end of the zoom value. That is, as the zoom value is changed from the wide-angle side toward the telephoto side, the signed parallax amount becomes larger nonlinearly, and a stereoscopic image of an object appears to get nearer to an observer at an accelerated rate. This enhances zooming.

Figure 9:
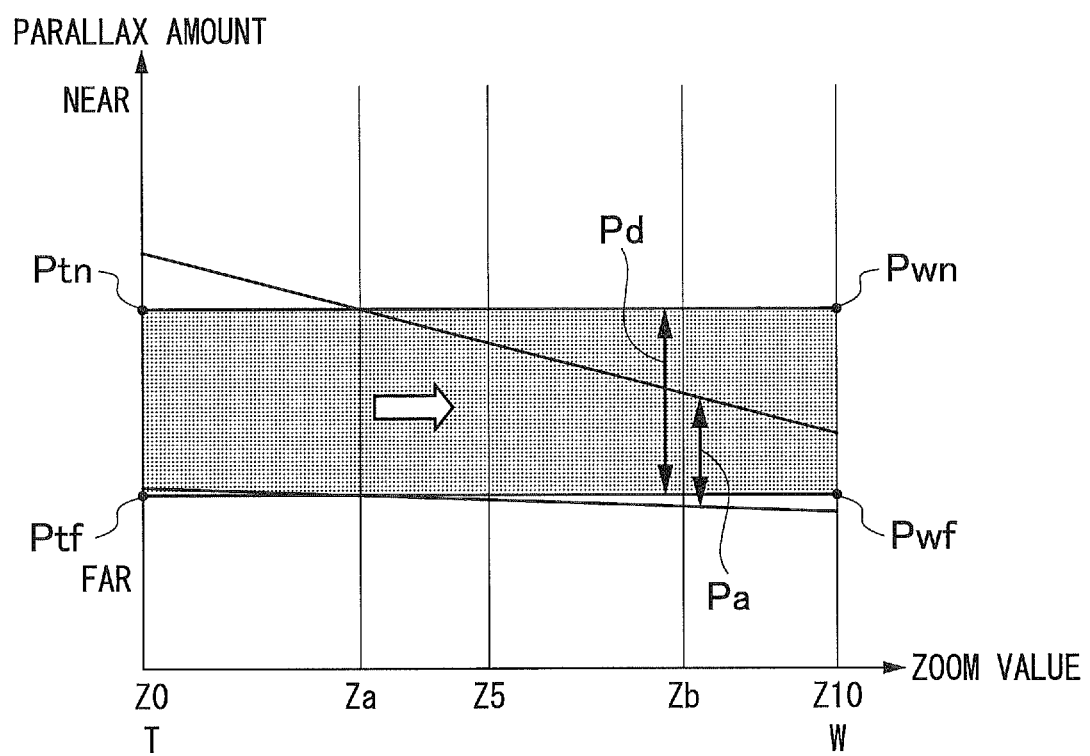
FIG. 9 is a diagram illustrating a correspondence relation between a zoom value and a corrected parallax amount in a fourth embodiment.

FIG. 9 is an explanatory diagram for explaining parallax amount correction of a fourth embodiment, indicating a correspondence relationship between the zoom value and the corrected parallax amount. The third embodiment is the same as the first embodiment in that the maximum parallax amount is corrected from Pmax to Ptn, the minimum parallax amount is corrected from Pmin to Pwf, and the parallax amount of each pixel is so corrected as to be between Ptn and Pwf, for a changing period of magnification when the zoom value is changing. In addition, a maximum relative parallax amount Pd is the same at the W end and the T end.

In the fourth embodiment, the parallax amount correcting unit 20 corrects the parallax amount of each pixel such that a difference in parallax amount corresponding to an object distance (a space between stereoscopic images) is not changed even if the acquired zoom value changes for a changing period of magnification when the acquired zoom value continues to change (during zooming) (so as not to change parallax amounts of respective objects). Then, after termination of the change in magnification (zooming), that is, the acquired zoom value does not change, the difference in parallax amount corresponding to an object distance (a space between stereoscopic images) is changed according to the zoom value after termination of the change in magnification. The parallax amount correcting unit 20 of this example corrects the parallax amount of each pixel such that a depthwise space between stereoscopic images different in object distance increases toward the telephoto side after termination of zooming. In addition, the parallax amount correcting unit 20 of this example changes the difference in parallax amount corresponding to an object distance (a space between stereoscopic images) in a stepwise fashion after termination of the change in magnification, and changes the difference in parallax amount corresponding to an object distance (a space between stereoscopic images) over substantially the same length of time as the length of zoom operation time after termination of zooming.

For example, in FIG. 9, when the zoom value is changed from Za to Zb in a direction of arrow, the maximum relative parallax amount Pd is maintained for a changing period of magnification when the zoom value changes from Za to Zb. The maximum relative parallax amount Pd is changed in a stepwise fashion to Pa after completion of the change in magnification. In this example, the maximum relative parallax amount is changed from Pd to Pa in a stepwise fashion over substantially the same length of time as the time elapsing from Za to Zb for the change in magnification (a changing period of magnification). That is, a difference in relative parallax amount between different objects is changed in a stepwise fashion after termination of the change in magnification. Ultimately, a difference in parallax amount between different objects is so set as to decrease toward the wide-angle side and increase toward the telephoto side.

Figure 10:
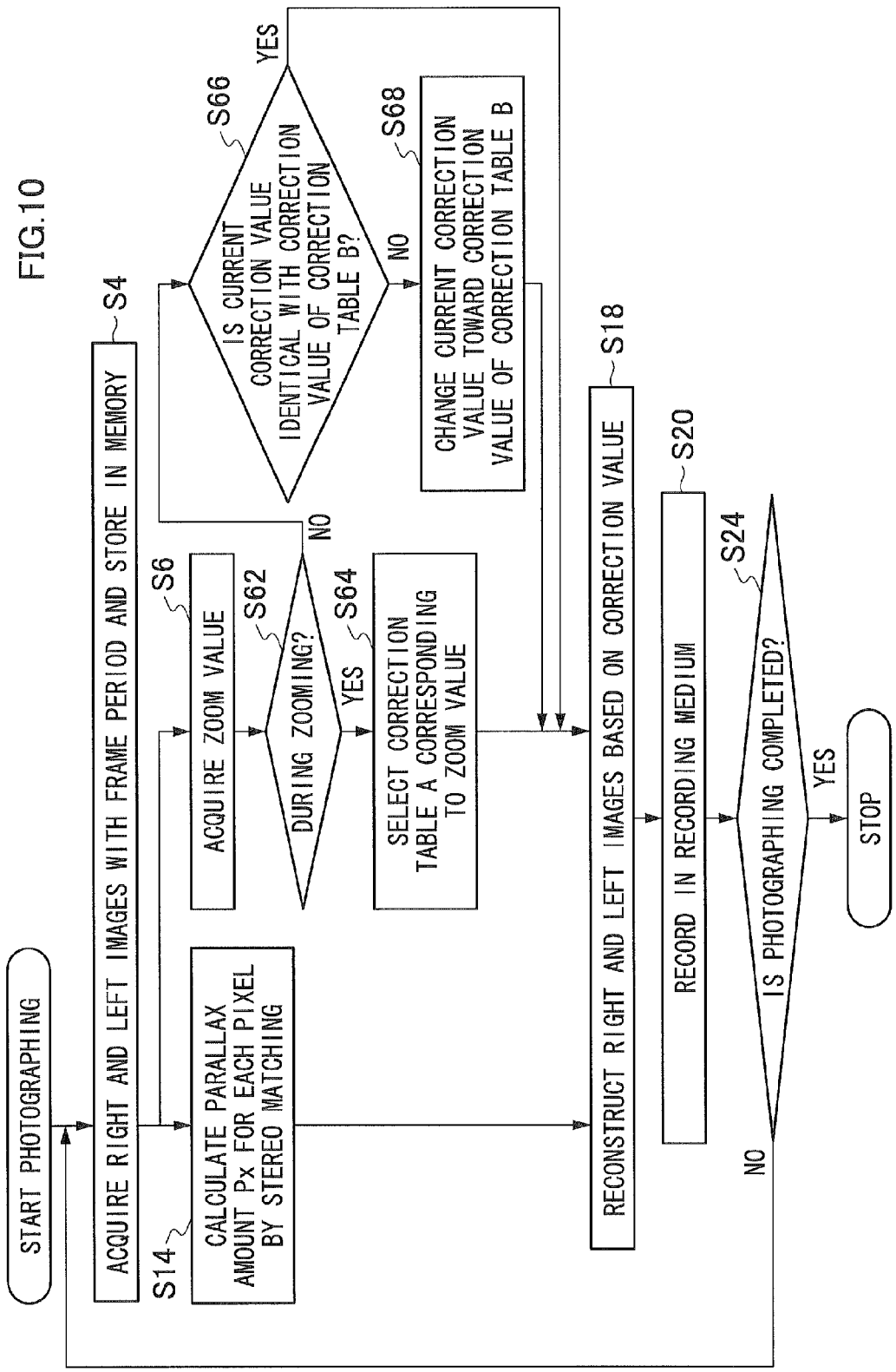
FIG. 10 is a flowchart illustrating a flow of an example of image processing performed in real time when a moving image is photographed, where further correction is performed after termination of zooming.

FIG. 10 is a flowchart illustrating a flow of one example of image processing that is performed in real time during video recording to perform further correction after zooming. This processing is executed by the control unit 25 according to a program. It should be noted that steps identical with those illustrated in FIG. 2 are denoted by identical reference signs, and only different points are described herein.

In this example, during a changing period of magnification, the parallax amount of each pixel is corrected such that the depths of stereoscopic images of respective objects not change if the zoom value changes, and during an unchanging period of magnification, the parallax amount of each pixel is corrected such that a difference between depthwise positions of stereoscopic images of objects different in object distance (parallax amount) increases toward the telephoto side.

It should be noted that after the zoom value is changed by the operation unit 16 and an instructed operation is accepted, the control unit 25 causes a lens driving unit (not illustrated) to drive the zoom lenses of the imaging lenses 11L, 11R. FIG. 10 omits to illustrate this control.

Steps S4, S6, S14, S18, S20, and S24 in FIG. 10 perform the same processing as those in FIG. 2.

In this example, after acquisition of a zoom value (step S6), it is determined whether or not the zoom value continues to change (step S62). The control proceeds to step S64 during a changing period of magnification and proceeds to step S66 during an unchanging period of magnification.

During a changing period of magnification, a correction table A corresponding to the zoom value is selected (step S64). That is, a correction value corresponding to the zoom value and a calculated parallax amount of each pixel is acquired.

During an unchanging period of magnification, it is determined whether or not a current correction value is matched with a correction value (set value) of a correction table B (step S66), and if unmatched, the current correction value is changed toward the correction value of the correction table B (step S68).

In the correction table A of this example, a corrected parallax amount that does not change a difference in parallax amount corresponding to an object distance (a space between stereoscopic images) with respect to a change in zoom value is registered. In the correction table B of this example, a corrected parallax amount that changes a difference in parallax amount corresponding to an object distance (a space between stereoscopic images) with respect to a change in zoom value is registered. In this example, a correction value (a corrected parallax amount) that corrects the parallax amount of each pixel such that a difference in parallax amount corresponding to an object distance (a space between stereoscopic images) increases toward the telephoto side is registered.

The processing at steps S62 to S68 is performed by the parallax amount correcting unit 20. The parallax amount correcting unit 20 in this example corrects the parallax amount of each pixel and reconstructs a multi-viewpoint image, during a changing period of magnification, such that depthwise positions of stereoscopic images of respective objects are not changed and is kept constant even if the zoom value changes, the parallax amount correcting unit 20 corrects the parallax amount of each pixel and reconstructs a multi-viewpoint image, after zooming, such that a space between different stereoscopic images increases toward the telephoto side. That is, the parallax amount of a stereoscopic image of an object is not changed during zooming, but the parallax amount of a stereoscopic image of an object is gradually changed after zooming. Thus, a change in the size of a stereoscopic image of an object during zooming and a change in the depthwise position of a stereoscopic image of an object after zooming are performed at different times. The length of time (a period) for which the parallax amount is gradually changed after zooming may be matched with (for example, proportional to) the length of time of zooming (a changing period of magnification).

It should be noted that though a case where the correction tables A, B are composed of the two parallax amount corrections illustrated in FIG. 9 (a correction corresponding to Pd and a correction corresponding to Pa), respectively, has been described, it is also possible to perform any one of the parallax amount corrections illustrated in FIGS. 4, 6, and 8 by the correction table A and perform a correction corresponding to Pa in FIG. 9 by the table B. In addition, it is also possible to store all correction tables for the parallax amount corrections illustrated in FIGS. 4, 6, 8, 9 (or any combination thereof) in the storage device and perform switching of the correction tables by mode setting.

In addition, a case where a correction table is selected according to a condition of the acquired zoom value (in this example, whether or not correction of the parallax amount is performed in a changing period of magnification) has been described as an example, but the present invention is not particularly limited to such a case. A correction table may be selected according to a mode of the imaging apparatus 10.

For example, the operating unit 16 accepts a selection instruction (mode designation) according to which one is selected from a plurality of modes corresponding to the plurality of correction tables. In this case, the parallax amount correcting unit 20 selects a correction table corresponding to a mode selected by the operating unit 16.

Figure 11A:
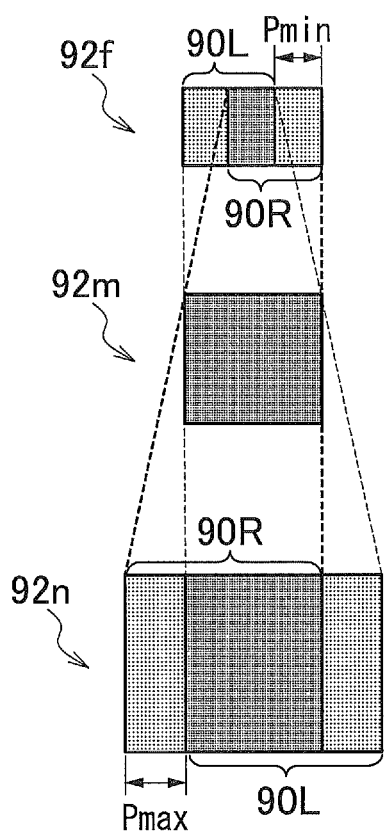
FIG. 11A is a diagram illustrating an example of an uncorrected multi-viewpoint image.
Figure 11B:
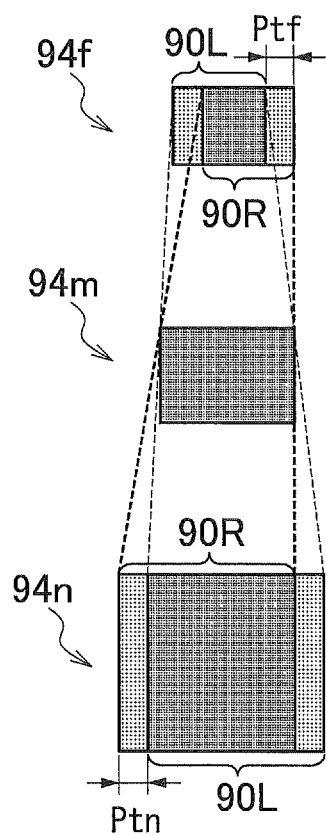
FIG. 11B is a diagram illustrating an example of a corrected multi-viewpoint image.

FIG. 11A illustrates stereoscopic images 92f, 92m, 92n of objects different in object distance in a multi-viewpoint image (the left eye image 90L, the right eye image 90R) at the T end before parallax amount correction. FIG. 11B illustrates the stereoscopic images 94f, 94m, 94n of objects different in object distance in a multi-viewpoint image (the left eye image 90L, the right eye image 90R) at the T end after parallax amount correction. FIGS. 11A and 11B illustrate the stereoscopic images of objects on a display screen of a monitor schematically. The stereoscopic images of objects denoted by reference signs 92f, 94f are stereoscopic images of objects imaged at the farthest object distance. The stereoscopic images of objects denoted by reference signs 92m, 94m are stereoscopic images of objects imaged at the middle point between the farthest object distance and the nearest object distance. The stereoscopic images of objects denoted by reference signs 92n, 94n are stereoscopic images of objects imaged at the nearest object distance. It should be noted that though FIGS. 11A and 11B illustrate the stereoscopic images of object having the same shape (quadrangle), in reality, the shape of a stereoscopic image of an object is not limited.

The parallax amounts Pmin, Pmax before parallax amount correction illustrated in FIG. 11A might be excessive parallax and divergent parallax amount, but the parallax amounts Ptf, Ptn after parallax amount correction fall within a stereoscopically fusible range. It should be noted that a multi-viewpoint image at the W end is omitted, but, as in the case of a multi-viewpoint image at the T end, the parallax amounts Pwf, Pwn after parallax amount correction fall within a stereoscopically fusible range.

FIGS. 4 to 9 illustrate cases where the corrected parallax amount at another zoom position and in another object distance is determined based on the W-end parallax amount Pwf, T-end parallax amount Pwf at the farthest object distance (for example, an infinite distance) and the W-end parallax amount Pnf, T-end parallax amount Pnf at the nearest object distance. The scope of the present invention, however, is not particularly limited to such cases.

The present invention includes any case where a multi-viewpoint image is reconstructed by correcting the parallax amount of each pixel such that a difference in parallax amount corresponding to an object distance (a space between stereoscopic images) is not changed in a specific situation.

An example of a correction table is illustrated in FIG. 12. As illustrated in FIG. 12, a correspondence relationship between an uncorrected parallax amount, a zoom value, and a corrected parallax amount is stored as a correction table in a storage device (the parallax amount correction value acquiring unit 19). The parallax amount correcting unit 20 acquires a corrected parallax amount of each pixel, from the correction table stored in the storage device, based on an acquired zoom value and a calculated uncorrected parallax amount of each pixel, when parallax amount correction is performed. Such parallax amount correction using a correction table can reduce processing time. That is, the parallax amount correction value acquiring unit 19 in FIG. 1 may be replaced with the correction table in FIG. 12.

A correction value used for parallax amount correction may be determined based on a user setting value. For example, an inputted or selected size of the monitor 21 (stereoscopic display device) outputting a multi-viewpoint image is accepted by the operating unit 16. This is because the display screen size determines a limit value of parallax amount divergence.

FIG. 13 illustrates a correspondence relationship between the display size and pixels of a monitor having a resolution of 1920×1080 dots.

In addition, means for accepting an input or a selection of an interpupillary distance for each user by the operation unit 16 may be provided. If a viewer of a multi-viewpoint image is a child, the interpupillary distance is about 5 cm, and therefore the number of pixels for 5 cm of the monitor size is set as a parallax amount lower limit Pwf.

A parallax amount upper limit Ptn is set at, for example, about 57 pixels, on the assumption that viewing is performed at a distance three times the height of a screen of the monitor. This Ptn depends on the allowable range of binocular fusion and therefore changes among different individuals. Therefore, it is preferred that the Ptn can be changed by user setting.

According to this embodiment, viewer's feeling of strangeness when zooming is changing is improved so that fatigue from stereoscopic vision can be suppressed. It is preferred that excessive parallax and divergence states can be reduced by correcting the parallax amount with respect to a change in zoom value from the wide-angle end to the telephoto end.

In actual photographing, the range of object distance might be narrow. For example, in indoor photographing, there is no object at infinite distance, or in photographing over a fence, a net, or the like, a nearest distance is also within a range far from the MOD (minimum focusing distance). In this case, the maximum value and the minimum value in an actual parallax distribution each have a margin from a limit value (Ptn and Pwf), and therefore the margin can be allocated to enhancing a zooming effect.

Specifically, a shift amount of parallax amount correction can be adjusted so that the maximum value becomes an upper limit value Ptn and the minimum value becomes a lower limit value Pwf. As a result, after parallax amount correction, the parallax amount distribution is changed such that the slope of a line indicating the correspondence relationship between the zoom value and the parallax amount at an identical object distance becomes large.

In this embodiment, the operating unit 16 accepts an input of setting information for determining a value used to correct a parallax amount (parallax amount correction value). The parallax amount correction value acquiring unit 19 calculates a parallax amount correction value based on the inputted setting information.

The setting information is, for example, a display size (monitor size) of the monitor 21.

The setting information may be, for example, at least one of object distance information of a nearest object and object distant information of a farthest object.

In addition, such a configuration can be adopted that the zoom value is set at the telephoto end or the wide-angle end by control of the control unit 25 and a parallax amount correction value is calculated by the parallax amount correction value acquiring unit 19 based on the parallax amount of a focused pixel.

In addition, such a configuration can be adopted that an input of zoom effect setting information for determining the amount of change in parallax amount with respect to the amount of change in zoom value is accepted by the operating unit 16 and a parallax amount correction value is calculated by the parallax amount correction value acquiring unit 19 based on the inputted zoom effect setting information.

Figure 14:
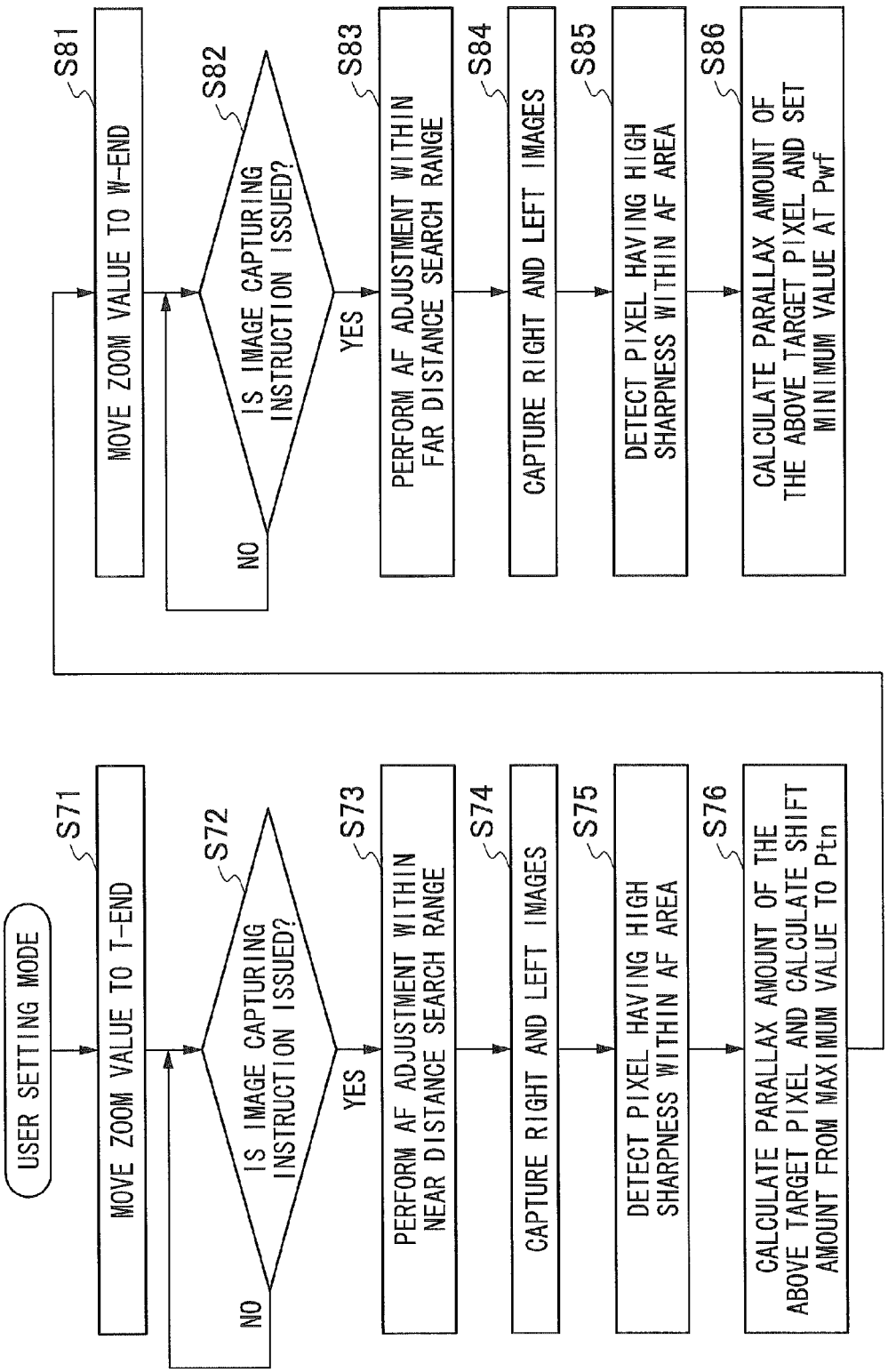
FIG. 14 is a flowchart illustrating a flow of an example of user setting processing.

FIG. 14 is a flowchart illustrating a flow of an example of user setting processing.

In FIG. 14, when user setting mode is selected, first, the zoom values (zoom positions) of the imaging lenses 11L, 11R are moved to (set at) the T end (step S71). Then, an object of objects to be photographed which is positioned nearest to a user is so guided by the monitor 21 as to fall within an AF area, and an image capturing instruction operation is accepted by the operating unit 16 (step S72). When the image capturing instruction is accepted, a priority is given to a near distance range and a focus position is found from the near distance side (step S73). That is, the nearest object of the objects to be photographed is focused on. Next, a left eye image and a right eye image are captured (step S74), and pixels whose sharpness is higher than a threshold value set in advance are detected in the AF area (step S75). Then, by calculating the parallax amounts of these pixels, a parallax amount maximum value Pa is determined, and a shift amount from this parallax amount maximum value Pa to Ptn (Ptn−Pa) is calculated (step S76).

Next, the zoom values (zoom positions) of the imaging lenses 11L, 11R are moved to (set at) the W end (step S81). Then, an object of objects to be photographed which is positioned farthest from a user is so guided by the monitor 21 as to fall within an AF area, and an image capturing instruction operation is accepted by the operating unit 16 (step S82). When the image capturing instruction is accepted, a priority is given to a far distance range and a focus position is found from the farthest object distance (step S83). That is, the farthest object of the objects to be photographed is focused on. Next, a left eye image and a right eye image are captured (step S84), and pixels whose sharpness is higher than a threshold value set in advance are detected in the AF area (step S85). Then, by calculating the parallax amounts of these pixels, a parallax amount minimum value Pb is determined, and a shift amount from this parallax amount minimum value Pb to Pwf (Pb−Pwf) is calculated (step S86).

It should be noted that stereo matching is performed when the parallax amount is determined, and therefore an image with higher sharpness improves matching accuracy and therefore improves accuracy in parallax amount.

In the above setting method, the shift amounts of the parallax amounts is calculated at both the telephoto end and the wide-angle end, but the present invention is not limited to such a case, and the shift amount of the parallax amount may be calculated at either the telephoto end or the wide-angle end.

In addition, such a configuration can be adopted that a direct input operation (or a selection input operation) of object distance information of a nearest object from a user (minimum object distance) and object distance information of a farthest object (maximum object distance) are accepted by the operating unit 16.

Such a configuration can be adopted that an input of zoom effect setting information for determining the amount of change in parallax amount with respect to the amount of change in zoom value may be accepted by the operating unit 16 and the parallax amount correction value is calculated by the parallax amount correction value acquiring unit 19 based on the inputted zoom effect setting information.

Hereinabove, a case where a still image display is performed during zooming has been described as an example, but the present invention is not particularly limited to such a case. The present invention is applicable to a case where moving image display is performed during zooming.

Figure 15:
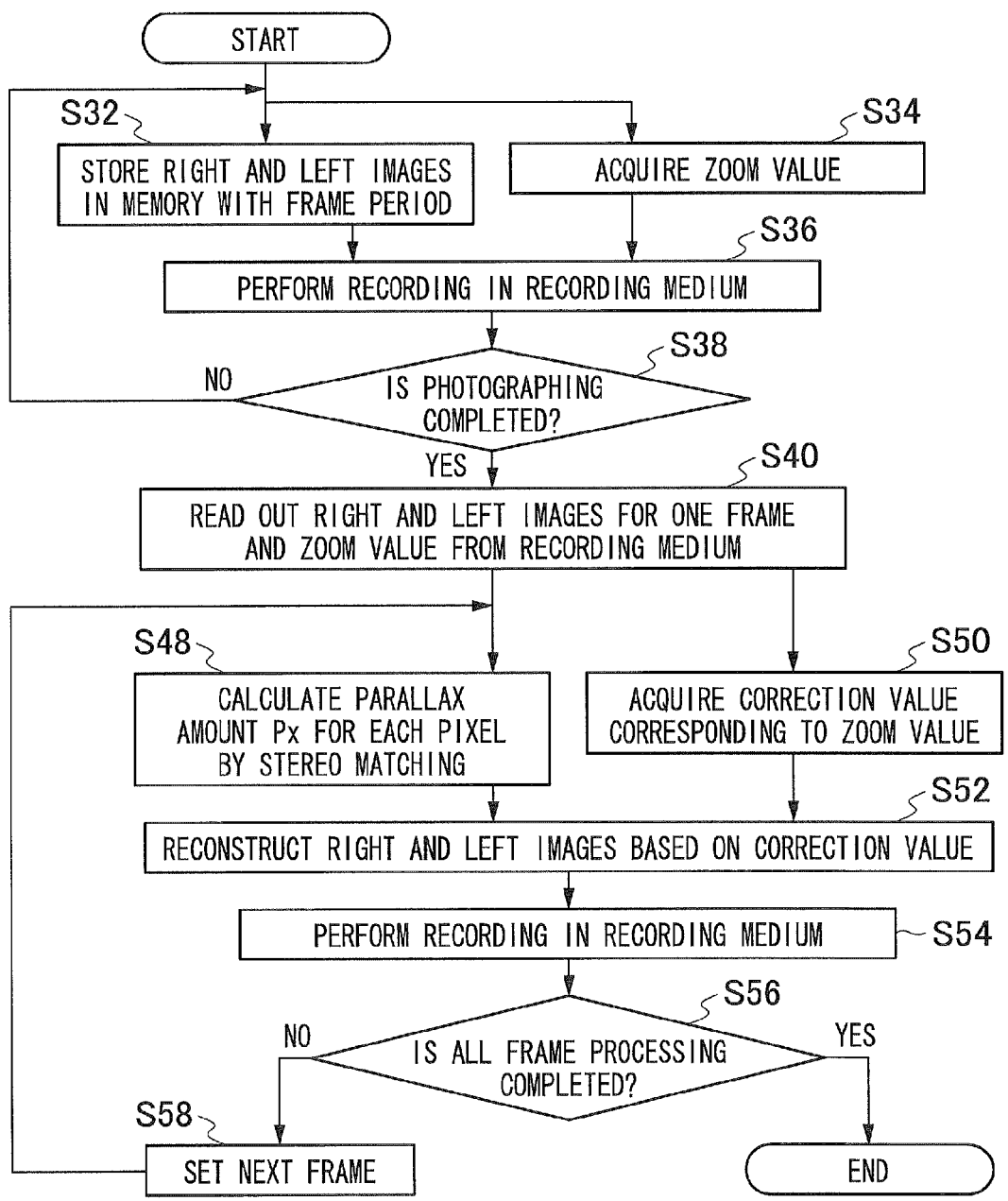
FIG. 15 is a flowchart illustrating a flow of another example of image processing performed after a moving image is photographed.

FIG. 15 is a flowchart illustrating a flow of an example of image processing performed after moving image photographing. This processing is executed according to a program by the control unit 25.

Steps S32, S34 in FIG. 15 are the same as steps S4, S6 in FIG. 2, respectively.

At step S36, the recording medium interface 22 records a multi-viewpoint image composed of a left eye image and a right eye image frame by frame in the recording medium 23. Here, the recording medium interface 22 records zoom value information in addition to the multi-viewpoint image, frame by frame, in the recording medium 23.

At step S38, it is determined whether photographing has been completed or is continued, and if photographing is continued, the processing returns to steps S32 and S34.

After moving image photographing is completed, as step S40, the recording medium interface 22 reads out the multi-viewpoint image (a left eye image and a right eye image) and the zoom value information, frame by frame, from the recording medium.

At step S40, the recording medium interface 22 reads out the multi-viewpoint image and the zoom value information of one frame from the recording medium 23.

Steps S48, S50, S52, S54 are the same as steps S14, S16, S18, S20 in FIG. 2, respectively.

At step S56, whether or not processing all frames has been completed, and if processing all frames is not completed, a next frame is focused on and a zoom value is read out from the image memory 15 (step S58), and the processing returns to step S48. If processing all frames has been completed, the processing is terminated.

Figure 16:
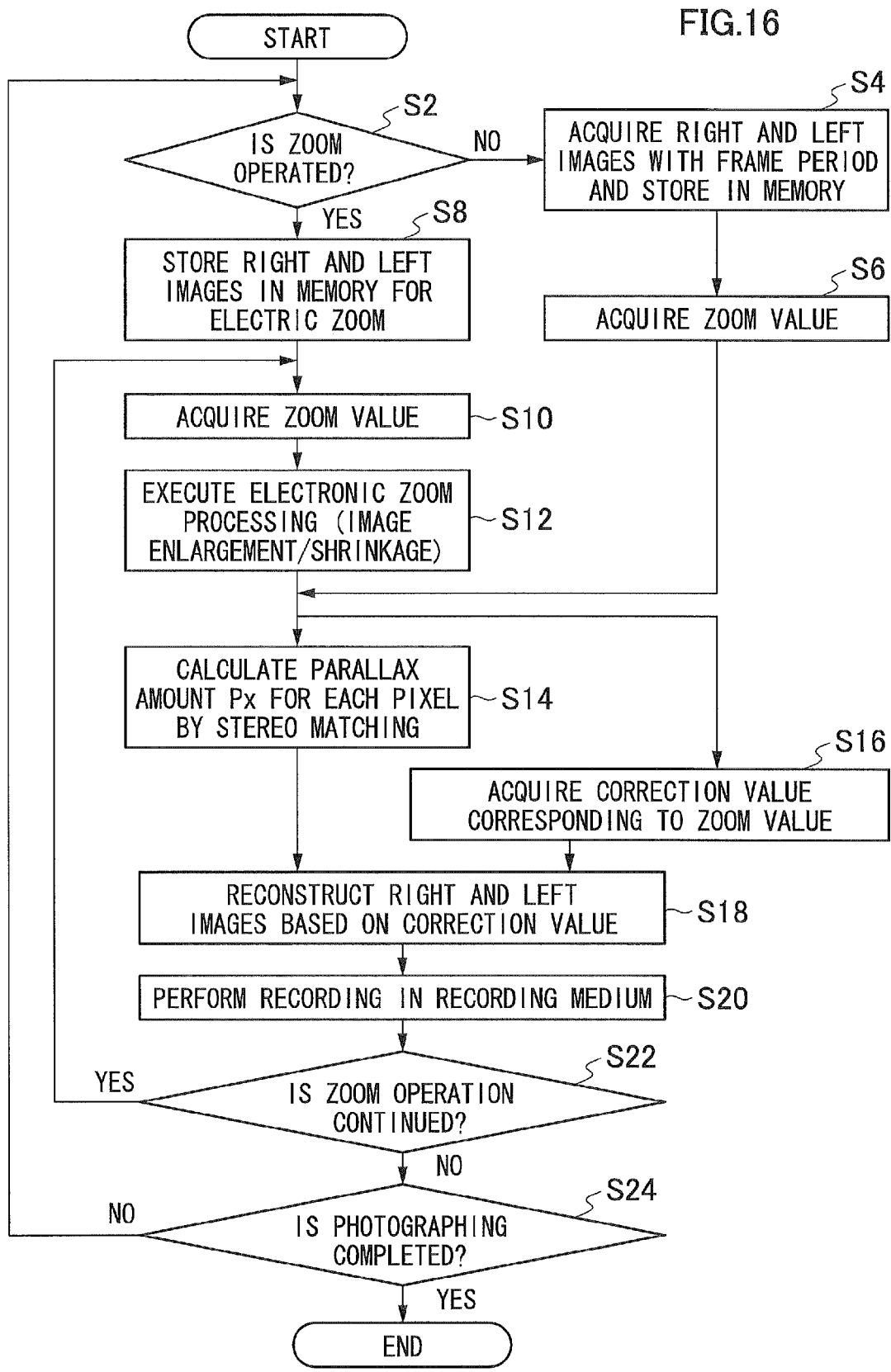
FIG. 16 is a flowchart illustrating a flow of another example of image processing performed in real time when a moving image is photographed.

FIG. 16 is a flowchart illustrating a flow of an example of image processing performed in real time during moving image photographing. This processing is executed according to a program by the control unit 25. It should be noted that the same steps as those illustrated in FIG. 2 are denoted by the same reference signs, and only different points will be described here.

In this example, when the operating unit 16 changes the zoom value and accepts an instruction operation, the control unit 25 causes the lens driving unit (not illustrated) to drive the zoom lenses of the imaging lenses 11L, 11R. FIG. 16 omits to illustrate the control.

First, whether or not a zoom operation has been performed by the operating unit 16 is determined (step S2), and if a zoom operation is not performed, a multi-viewpoint image (a left eye image and a right eye image) is acquired by the imaging unit 14 with a period of one frame and stored in the image memory 15 (step S4), and a zoom value of the multi-viewpoint image is acquired from the operating unit 16 (step S6). It should be noted that steps S4, S6 in FIG. 16 are identical with steps denoted by the same reference signs in FIG. 2, respectively. If a zoom operation has been performed, one frame of the multi-viewpoint image (a left eye image and a right eye image) at the zoom operation time (immediately before the zoom value changes) is stored in a memory for electronic zoom (step S8), a zoom value is acquired from the operating unit 16 (step S10), and according to the acquired zoom value, the multi-viewpoint image stored in the image memory 15 is changed in magnification (scaled), by the electronic zoom processing unit 17 (step S12). The memory for electronic zoom may be housed in the electronic zoom processing unit 17, or the image memory 15 may be selectively used as a memory for a real-time multi-viewpoint image and a memory for electronic zoom.

Steps S14 to S20 in FIG. 16 are identical with the respective steps denoted by the same reference signs in FIG. 2.

At step S22, whether or not the zoom operation is continued is determined, and if the zoom operation is continued, the processing returns to step S10. In addition, whether or not photographing has been completed or is continued (step S24), and if photographing is continued, the processing returns to step S2.

In this processing, while the acquired zoom value is changing, a multi-viewpoint image (a stereoscopic still image) of one frame immediately before or immediately after a change in zoom value is changed in magnification by the electronic zoom processing unit 17 and outputted to the monitor 21. On the other hand, while the acquired zoom value is not changing, multi-viewpoint images (a stereoscopic moving image) of a plurality of frames are outputted to the monitor 21.

Figure 17:
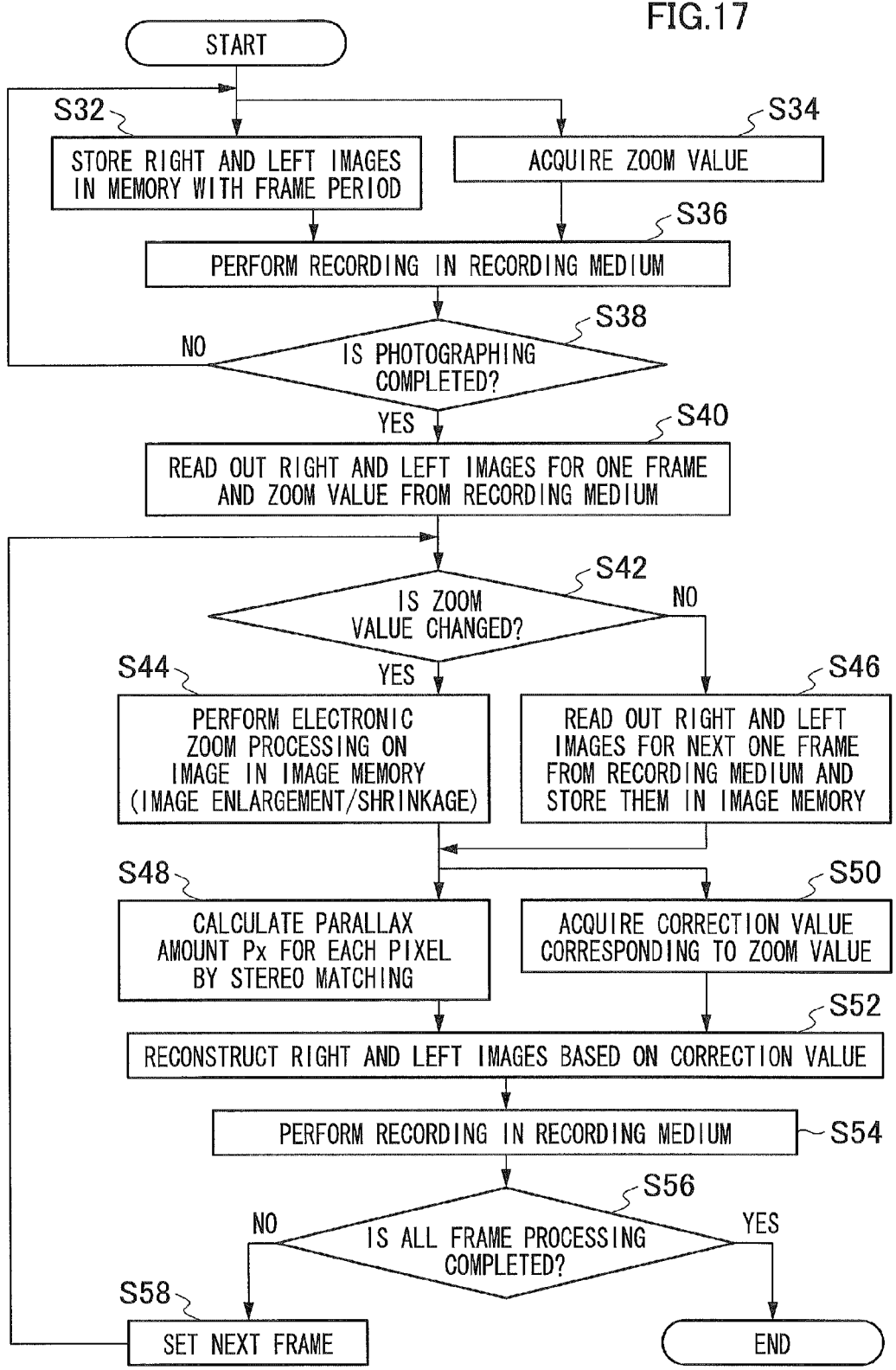
FIG. 17 is a flowchart illustrating a flow of an example of image processing when image processing is performed after a moving image is photographed.

FIG. 17 is a flowchart illustrating an example of image processing in a case where image processing is performed after moving image photographing.

Steps S32 to S40 are identical with steps in FIG. 15, respectively.

At step S42, whether or not the zoom value is changed is determined.

If the zoom value is changed, at step S44 the multi-viewpoint image in the image memory 15 is changed in magnification (scaled) by the electronic zoom processing unit 17.

If the zoom value is not changed, at steps S46 a multi-viewpoint image (a left eye image and a right eye image) of a next one frame is read out from the recording medium 23 and stored in the image memory 15.

Steps S48 to S58 are identical with steps in FIG. 15.

In this processing, while the acquired zoom value is changing, a multi-viewpoint image (a stereoscopic still image) of one frame immediately before or immediately after the change in zoom value is changed in magnification by the electronic zoom processing unit 17 and outputted to the monitor 21, and while the acquired zoom value is not changing, multi-viewpoint images (stereoscopic moving images) of a plurality of frames are outputted to the monitor 21.

Figure 18:
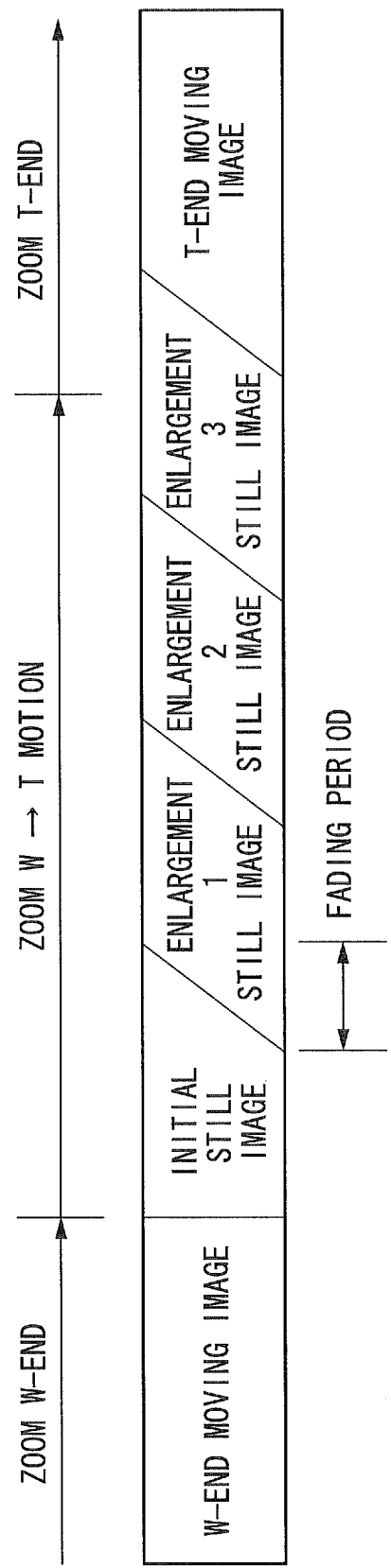
FIG. 18 is an explanatory diagram used to explain electronic zoom of a stereoscopic still image.

As illustrated in FIG. 18, the control unit 25 divides a period for which the zoom value continues to change (a changing period of magnification) into a plurality of periods, and if the zoom value is continuously changing, the control unit 25 switches the change in zoom value from a continuous change to a stepwise change, thereby outputting and displaying a plurality of still images (stereoscopic still images) changed in magnification in a stepwise fashion for the changing period of the zoom value (a changing period of magnification) sequentially to the monitor 21, and recording the still images in the recording medium 23.

In addition, the control unit 25 makes the length of total display time of the plurality of still images changed in magnification longer than the changing period of the zoom value (a changing period of magnification). For example, in FIG. 18, the length of total display time of an "initial still image", an "enlarged 1 still image", an "enlarged 2 still image", and an "enlarged 3 still image" is longer than the length of time of a "zoom W→T motion".

Figure 19:
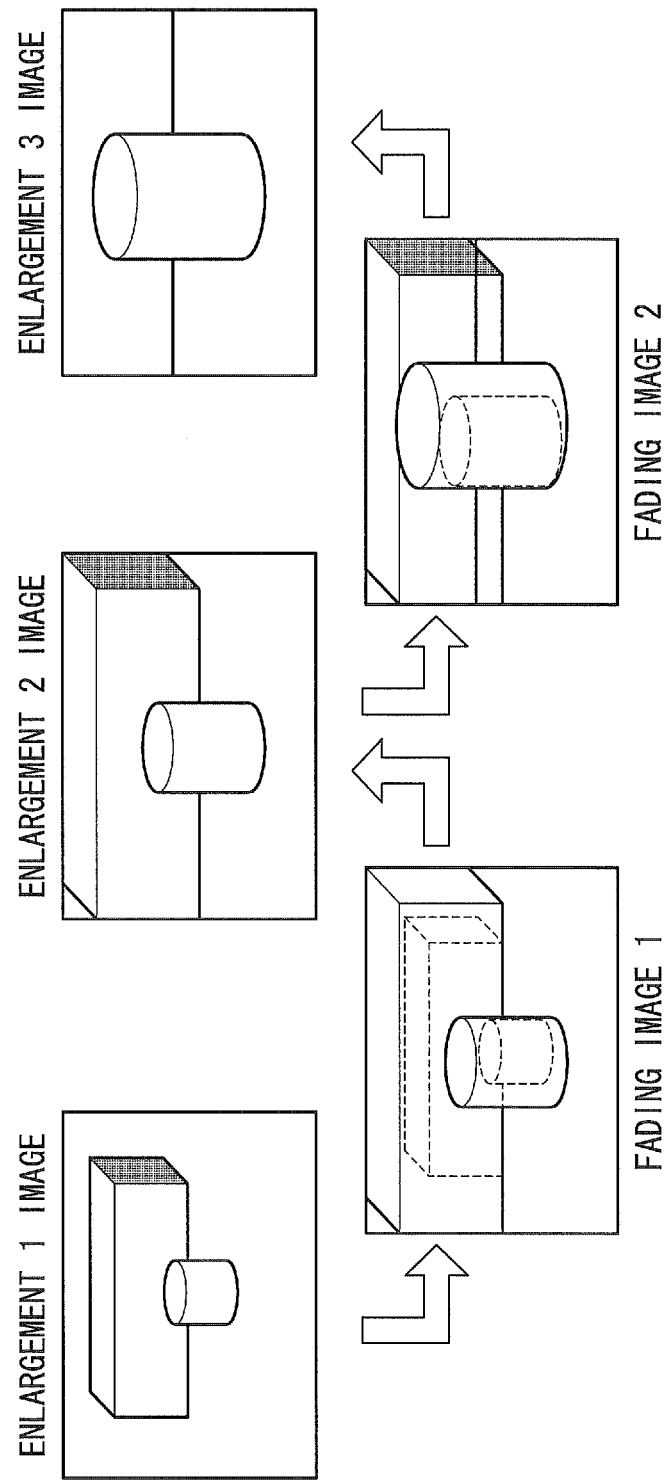
FIG. 19 is an explanatory diagram used to explain fading display of a stereoscopic still image.

In addition, as illustrated in FIG. 19, the control unit 25 performs display switching of the plurality of still images (stereoscopic still images) on the monitor 21 in a fade-in and fade-out manner. That is, while displaying one still image in a fade-out manner the control unit 25 displays another still image in a fade-in manner.

Figure 20:
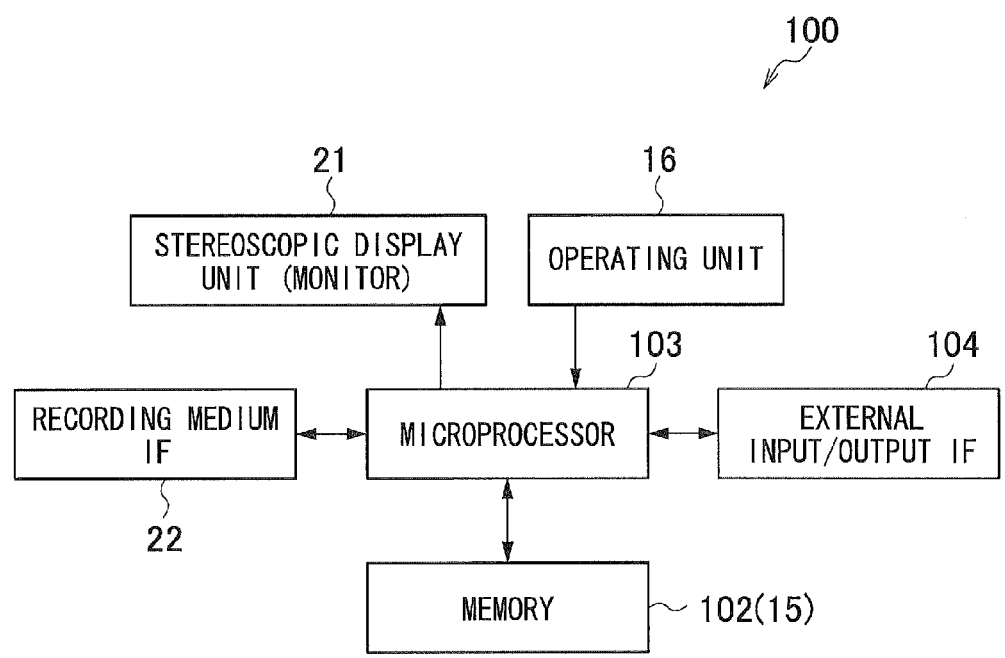
FIG. 20 is a block diagram illustrating a hardware configuration of a computer device to which the present invention is applied.

It should be noted that though a case where the present invention is applied to the imaging apparatus has been described as an example, the present invention is not particularly limited to such a case. For example, the present invention may be applied to a computer device 100 illustrated in FIG. 20. In FIG. 20, the components identical with those illustrated in FIG. 1 are denoted by the same reference signs.

The personal computer device 100 illustrated in FIG. 20 includes the operating unit 16, the stereoscopic display unit 21 (monitor), the recording medium interface 22, a memory 102, a microprocessor 103, and an external input/output IF (interface) 104. The microprocessor 103 has the respective functions of the electronic zoom processing unit 17, the parallax amount calculating unit 18, the parallax amount correction value unit 19, the parallax amount correcting unit 20, and the control unit 25 in FIG. 1. The memory 102 has the function of the image memory 15 in FIG. 1. The external input/ output IF 104 inputs a multi-viewpoint image from a compound-eye camera (an imaging device capable of imaging a multi-viewpoint image) to the device 100 in FIG. 20, and outputs the multi-viewpoint image whose parallax amount has been corrected by the microprocessor 103 to an external device, such as a hard disk device or a disk recording device.

The personal computer device 100 (an image processing apparatus) illustrated in FIG. 20 is used as an editing device dedicated to edit a multi-viewpoint image (including parallax amount correction), or as a reproduction device that reproduces and displays a multi-viewpoint image (including a multi-viewpoint after parallax amount correction) on the stereoscopic display unit 21.

It should be noted that though a two-viewpoint image composed of a left eye image and a right eye image has been described as an example of a multi-viewpoint image, the present invention may be applied to a multi-viewpoint image composed of three or more viewpoint images.

The present invention is not limited to an example described in this text or an example illustrated in the figures, and, of course, can be changed in design or modified variously without departing from the scope of the present invention.

What is claimed is:

1. An image processing apparatus comprising:
   an image acquiring unit configured to acquire a multi-viewpoint image including a plurality of viewpoint images;
   a zoom value acquiring unit configured to acquire a zoom value of the multi-viewpoint image acquired by the image acquiring unit;
   a parallax amount calculating unit configured to calculate a parallax amount of each pixel of objects different in an object distance between the plurality of viewpoint images constituting the acquired multi-viewpoint image;
   a parallax amount correcting unit configured to correct the parallax amount of each pixel of at least a portion of the acquired multi-viewpoint image by image processing, based on the zoom value acquired by the zoom value acquiring unit and the parallax amount of each pixel of the objects different in object distance calculated by the parallax amount calculating unit, the parallax amount correcting unit configured to correct the parallax amount of each pixel of the objects different in object distance and configured to reconstruct the multi-viewpoint image such that relative differences in parallax amount between the objects different in object distance are kept unchanged with a position of a convergence point kept even if the acquired zoom value is changed,
   wherein the parallax amount correcting unit equalizes parallax amounts at a zoom start point and at a zoom termination point.

2. The image processing apparatus according to claim 1, wherein
   the parallax amount correcting unit corrects the parallax amount of each pixel such that parallax amount of respective objects are kept unchanged even if the acquired zoom value is changed.

3. The image processing apparatus according to claim 1, wherein
   the parallax amount correcting unit corrects the parallax amount of each pixel such that stereoscopic images of respective objects become nearer to a viewer as the acquired zoom value changes from a wide-angle side toward a telephoto side.

4. The image processing apparatus according to claim 1, wherein
   the parallax amount correcting unit performs correction such that a parallax amount changes nonlinearly from a wide-angle side toward a telephoto side.

5. The image processing apparatus according to claim 1, wherein
   the parallax amount correcting unit corrects the parallax amount of the each pixel such that the difference in parallax amount between objects different in object distance is kept constant with respect to the change in zoom value between a nearest distance and a farthest distance.

6. The image processing apparatus according to claim 1, wherein
   the parallax amount correcting unit corrects the parallax amount of the each pixel such that the difference in parallax amount corresponding to an object distance is kept unchanged, even if the acquired zoom value is changed, during a changing period of magnification for which the acquired zoom value is changing, and
   the parallax amount correcting unit changes the difference in parallax amount corresponding to an object distance after a magnification change termination at which the acquired zoom value stops changing.

7. The image processing apparatus according to claim 6, wherein
   the parallax amount correcting unit corrects the parallax amount of the each pixel, after the magnification change termination, such that the difference in parallax amount corresponding to the object distance increases toward a telephoto side.

8. The image processing apparatus according to claim 6, wherein
   the parallax amount correcting unit changes the difference in parallax amount corresponding to the object distance in a stepwise fashion after the magnification change termination.

9. The image processing apparatus according to claim 6, wherein
   the parallax amount correcting unit changes the difference in parallax amount corresponding to the object distance, after the magnification change termination, over substantially a same length of time as a magnification change.

10. The image processing apparatus according to claim 1, further comprising
    a storing unit configured to store a correction table indicating a correspondence relationship between an uncorrected parallax amount, a zoom value, and a corrected parallax amount, wherein
    the parallax amount correcting unit reconstructs the multi-viewpoint image with use of the corrected parallax amount acquired from the correction table based on the acquired zoom value and the calculated parallax amount of each pixel.

11. The image processing apparatus according to claim 10, wherein
    the storing unit stores a plurality of correction tables having different correction amounts of a parallax amount corresponding to variations of a zoom value, and
    the parallax amount correcting unit selects any one of the plurality of correction tables to reconstruct the multi-viewpoint image.

12. The image processing apparatus according to claim 11, further comprising
    an instruction inputting unit configured to accept a selection instruction by which one is selected from a plurality of modes corresponding to the plurality of correction tables, respectively, wherein the parallax amount correcting unit selects the correction table corresponding to the mode selected by the instruction inputting unit.

13. The image processing apparatus according to claim 6, further comprising a storing unit configured to store a correction table indicating a correspondence relationship between an uncorrected parallax amount, a zoom value, and a corrected parallax amount, the storing unit configured to store a first correction table in which the difference in parallax amount corresponding to the object distance is kept unchanged even if the zoom value is changed, and a second correction table in which the difference in parallax amount corresponding to the object distance is changed with respect to a change in zoom value, wherein the parallax amount correcting unit selects the first correction table during the changing period of magnification, selects the second correction table after the magnification change termination, and reconstructs the multi-viewpoint image with use of the corrected parallax amount acquired from the selected correction table based on the acquired zoom value and the calculated parallax amount of each pixel.

14. The image processing apparatus according to claim 1, further comprising a calculating unit configured to calculate a corrected parallax amount of each pixel based on the acquired zoom value and the calculated parallax amount of each pixel.

15. The image processing apparatus according to claim 1, further comprising a recording unit configured to record a multi-viewpoint image whose parallax amount is not corrected yet by the parallax amount correcting unit or a multi-viewpoint image whose parallax amount has been corrected by the parallax amount correcting unit.

16. The image processing apparatus according to claim 15, wherein the image acquiring unit acquires the multi-viewpoint image whose parallax amount has not been corrected yet from the recording unit, and the parallax amount correcting unit corrects a parallax amount of each pixel of the multi-viewpoint image acquired from the recording unit.

17. The image processing apparatus according to claim 1, further comprising:

a setting information inputting unit configured to accept an input of setting information for determining a value used in the parallax amount correction; and a parallax amount correction value calculating unit configured to calculate a correction value of the parallax amount of the each pixel based on the setting information inputted by the setting information inputting unit.

18. The image processing apparatus according to claim 17, wherein the setting information includes a display size of the multi-viewpoint image.

19. The image processing apparatus according to claim 17, wherein the setting information includes distance information on at least one of a nearest object and a farthest object.

20. The image processing apparatus according to claim 1, further comprising a parallax amount correction value calculating unit configured to calculate a correction value of the parallax amount of each pixel, with the zoom value set at least one of a telephoto end and a wide-angle end, based on a parallax amount of a focused pixel.

21. The image processing apparatus according to claim 1, further comprising:

an electronic zoom unit configured to change the magnification of the acquired multi-viewpoint image by electronic zoom;

an outputting unit capable of outputting the acquired multi-viewpoint image; and a controlling unit configured to change, when the zoom value is changed, the magnification of the multi-viewpoint image immediately before or immediately after the zoom value is changed, according to the zoom value, by the electronic zoom unit, configured to perform parallax amount correction according to the zoom value by the parallax amount correcting unit, and configured to output a stereoscopic still image to the outputting unit, while the controlling unit outputs a stereoscopic moving image of the multi-viewpoint image acquired by the image acquiring unit to the outputting unit when the zoom value is not changed.

22. The image processing apparatus according to claim 21, wherein the controlling unit makes a length of time of displaying a stereoscopic still image changed in magnification longer than a period of a change in zoom value.

23. The image processing apparatus according to claim 21, wherein the controlling unit causes the outputting unit to output the stereoscopic still image which is changed in magnification in a stepwise fashion by changing the zoom value in a stepwise fashion.

24. The image processing apparatus according to claim 21, wherein the controlling unit performs switching of the stereoscopic still image in a fade-in or fade-out manner.

25. An imaging apparatus comprising the image processing apparatus according to claim 1, wherein the image acquiring unit includes an imaging lens, and an imaging device configured to image an object image formed by the imaging lens.

26. The imaging apparatus according to claim 25, wherein the imaging lens includes a zoom lens, and the zoom value acquiring unit acquires a zoom value of the zoom lens as a zoom value of the multi-viewpoint image.

27. A reproduction apparatus comprising:

the image processing apparatus according to claim 1; and a reproducing unit configured to reproduce the reconstructed multi-viewpoint image in a stereoscopically viewable fashion.

28. An image processing method using an image acquiring unit configured to acquire a multi-viewpoint image including a plurality of viewpoint images, and a zoom value acquiring unit configured to acquire a zoom value of the multi-viewpoint image acquired by the image acquiring unit, the method comprising:

calculating a parallax amount of each pixel of objects different in an object distance between the plurality of viewpoint images constituting the acquired multi-viewpoint image;

correcting a parallax amount of each pixel of at least a portion of the acquired multi-viewpoint image by image processing, based on the acquired zoom value and the calculated parallax amount of each pixel of the objects different in object distance, and correcting the parallax amount of each pixel of the objects different in object distance and reconstructing the multi-viewpoint image such that relative differences in parallax amount between the objects different in object distance are kept unchanged with a position of a convergence point kept even if the acquired zoom value is changed; and
equalizing parallax amounts at a zoom start point and at a zoom termination point.

* * * * *